(12) United States Patent
Kraimer et al.

(10) Patent No.: US 7,793,979 B2
(45) Date of Patent: Sep. 14, 2010

(54) OPERATOR BACKREST AND KNEE SUPPORT PAD FOR A MATERIALS HANDLING VEHICLE

(75) Inventors: James V. Kraimer, Celina, OH (US); Craig J. Rekow, Troy, OH (US); Benjamin J. Purrenhage, Troy, OH (US); Markus Graf, Karlsfeld (DE)

(73) Assignee: Crown Equipment Corporation, New Bremen, OH (US)

( * ) Notice: Subject to any disclaimer, the term of this patent is extended or adjusted under 35 U.S.C. 154(b) by 523 days.

(21) Appl. No.: 11/670,779

(22) Filed: Feb. 2, 2007

(65) Prior Publication Data
US 2007/0207024 A1    Sep. 6, 2007

Related U.S. Application Data

(60) Provisional application No. 60/764,882, filed on Feb. 3, 2006, provisional application No. 60/864,211, filed on Nov. 3, 2006.

(51) Int. Cl.
  *B60J 11/00*    (2006.01)
(52) U.S. Cl. .................... 280/770; 150/166
(58) Field of Classification Search .......... 280/770, 280/47.11, 43.12, 784, 751; 150/157, 166; 180/19.1, 19.2, 19.3
See application file for complete search history.

(56) References Cited

U.S. PATENT DOCUMENTS

| | | | |
|---|---|---|---|
| 2,354,178 A | 7/1944 | Ulinski | |
| 2,913,062 A * | 11/1959 | Ulinski | 180/19.2 |
| 3,265,158 A | 8/1966 | Constable | |
| 3,298,712 A | 1/1967 | Greenstadt | |
| D222,694 S | 12/1971 | Goodacre | |
| 3,738,441 A * | 6/1973 | Kemner | 180/65.1 |
| 4,643,471 A | 2/1987 | Fishback | |
| 4,750,767 A | 6/1988 | Barnett | |
| 4,849,272 A | 7/1989 | Haney et al. | |
| 4,974,892 A | 12/1990 | Huard | |
| 5,129,695 A | 7/1992 | Norman, II | |
| RE34,194 E * | 3/1993 | Stowell et al. | 16/421 |
| 5,195,778 A | 3/1993 | Dismuke | |
| 5,245,144 A | 9/1993 | Stammen | |

(Continued)

FOREIGN PATENT DOCUMENTS

EP    0 570 658 A    11/1993

(Continued)

OTHER PUBLICATIONS

Crown advertisement brochure No. SF12163 Rev. Jun. 1998 entitled Crown 3000 Series PE.

(Continued)

*Primary Examiner*—Jeffrey J Restifo
(74) *Attorney, Agent, or Firm*—Stevens & Showalter LLP

(57) ABSTRACT

An operator backrest in combination with a materials handling vehicle is provided. The backrest may comprise a primary support pad and gripping structure located in at least one side portion of the primary support pad. The gripping structure may be substantially even with or extend above a surface of a portion of the primary support pad surrounding the gripping structure for engagement with an operator positioned on the materials handling vehicle.

8 Claims, 28 Drawing Sheets

U.S. PATENT DOCUMENTS

| | | |
|---|---|---|
| 5,511,822 A | 4/1996 | Wolanski |
| D373,887 S | 9/1996 | Soederberg |
| D373,888 S | 9/1996 | Soederberg |
| 5,664,825 A | 9/1997 | Henke et al. |
| 5,799,975 A | 9/1998 | Crick |
| 5,945,194 A | 8/1999 | Pester |
| 6,062,601 A | 5/2000 | Willie et al. |
| 6,113,142 A * | 9/2000 | Tolbert ............... 280/770 |
| 6,182,778 B1 | 2/2001 | Henshaw et al. |
| 6,189,964 B1 | 2/2001 | Henshaw et al. |
| 6,273,626 B1 * | 8/2001 | Yazawa ................ 401/6 |
| 6,464,025 B1 | 10/2002 | Koeper et al. |
| 6,595,306 B2 * | 7/2003 | Trego et al. ............ 180/19.2 |
| D492,833 S * | 7/2004 | Henshaw et al. ......... D34/34 |
| 6,948,739 B2 * | 9/2005 | Gallagher et al. ........ 280/770 |
| 6,948,764 B1 * | 9/2005 | Haddock .............. 296/136.07 |
| D539,503 S | 3/2007 | Quinlan, Jr. et al. |
| D542,005 S | 5/2007 | Weiner et al. |
| 7,267,369 B2 * | 9/2007 | Gallagher et al. ........ 280/770 |
| D562,525 S * | 2/2008 | Graf et al. .............. D34/34 |
| 2004/0099486 A1 | 5/2004 | Gramatikov et al. |
| 2005/0016782 A1 * | 1/2005 | Gallagher et al. ....... 180/89.12 |
| 2005/0036880 A1 | 2/2005 | Magoto et al. |
| 2005/0236197 A1 * | 10/2005 | Gallagher et al. ........ 180/65.1 |
| 2007/0182121 A1 * | 8/2007 | Kraimer et al. .......... 280/166 |
| 2007/0207024 A1 * | 9/2007 | Kraimer et al. .......... 414/685 |

FOREIGN PATENT DOCUMENTS

| | | |
|---|---|---|
| EP | 1 388 518 A | 2/2004 |
| JP | 2000 169094 A | 6/2000 |

OTHER PUBLICATIONS

Crown specification brochure No. SF12155 Rev. Oct. 1999 entitled Crown PE 3000 Series end control pallet truck.
Crown advertisement brochure No. VFS-GPC-05-GB Sep. 2002 entitled Series GPC 2000, Germany.
Photo of Crown GPC 2000 truck.
Photo of Still CS truck.
Photo of Linde N20 truck.
Photo of Jungheinrich ECE truck.
BT Product Information Brochure for OPUS OL20.
Side View of BT Opus OL 20.
Side View of ATLET Tempo PPL.
Side View of Crown GPC 2000 truck.
Side View of Still CS 20.
Side View of Jungheinrich ECE 20.
Top View of Jungheinrich ECE 20.
Top View of Still CS20.
Crown advertisement brochure No. SF12386 Rev. Jun. 1998 entitled Crown Stand-up Rider Lift Truck RC 3000 Series.
Crown advertisement brochure No. VFS-PR-02-GB Aug. 1998 entitled Rider Pallet Trucks Series PR 3000.
Vachey, Clement; International Search Report and Written Opinion of the International Searching Authority; International Application No. PCT/US2007/061545; Jun. 23, 2009; European Patent Office.
Crown specification brochure No. SF14641 Mar. 2006, entitled Crown TR 3600 Series, Tow Tractor, U.S.A.
Crown specification brochure No. GPC2000 SL BROCH Jun. 2005 30-M01353-006-00, entitled Crown 2000 Scissors Lift Series, Germany.
Crown specification brochure No. VFS-GPC-Tow-02-GB Jun. 2003, entitled Crown GPC-Tow Series, Tow Tractor, Germany.

* cited by examiner

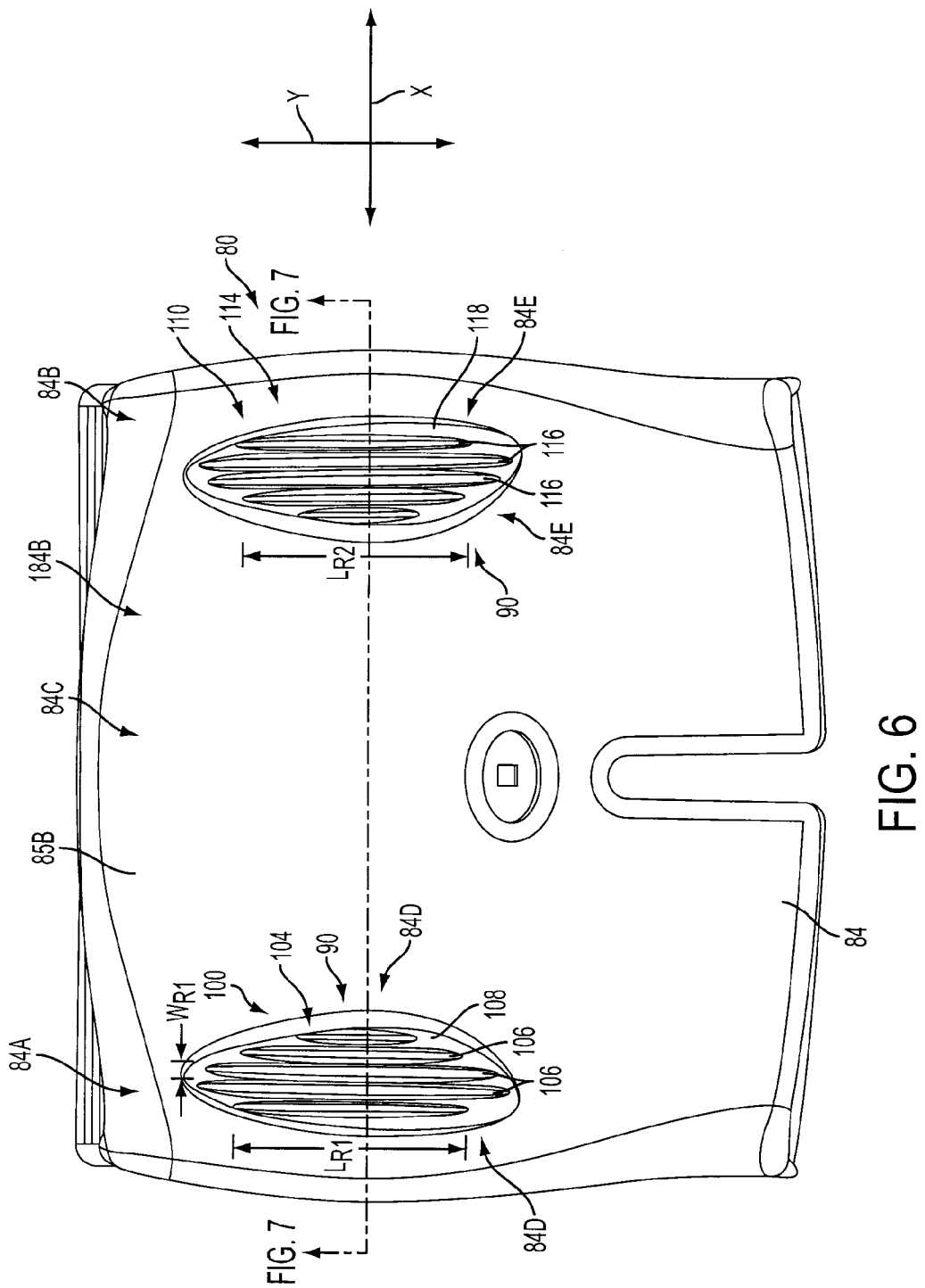

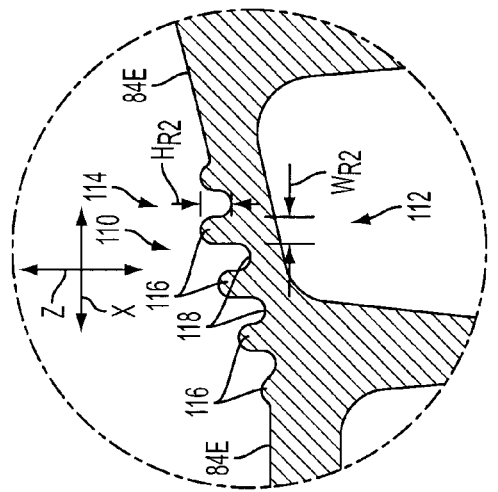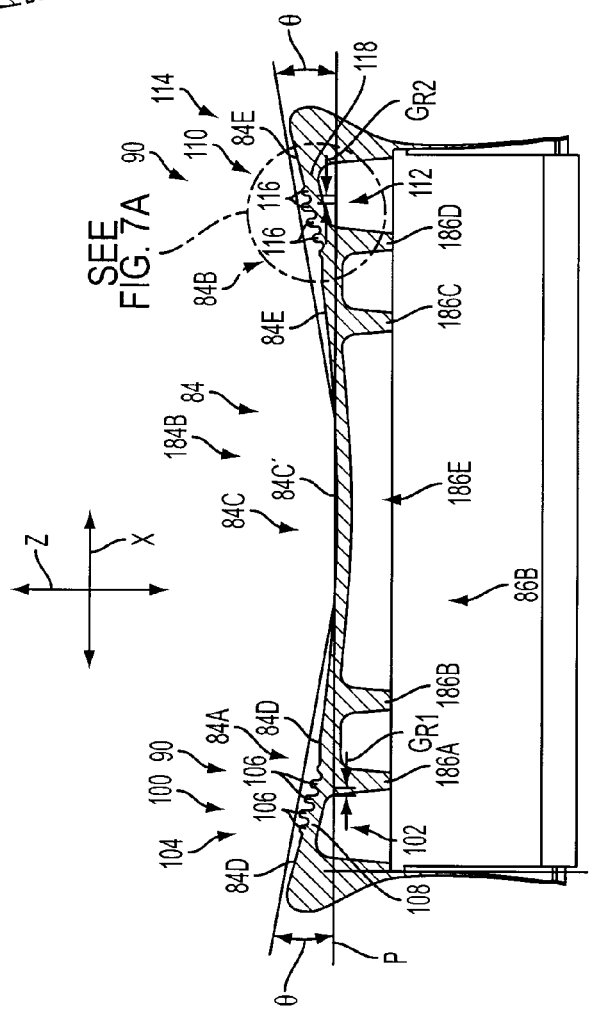

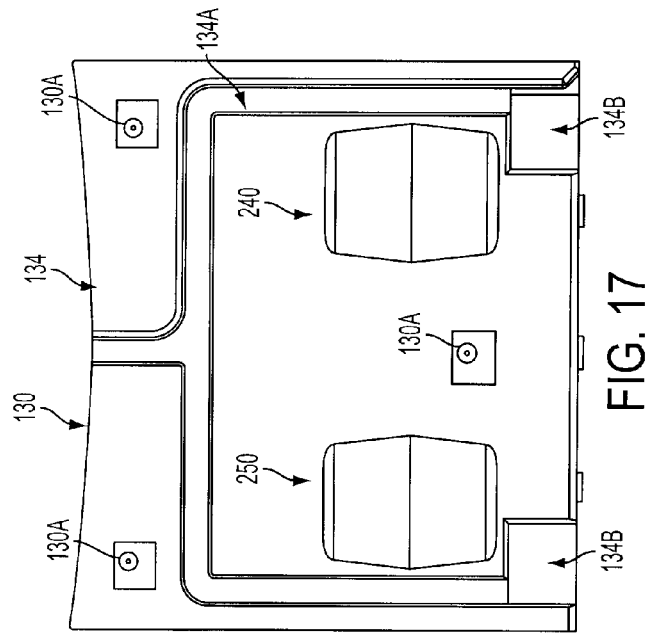
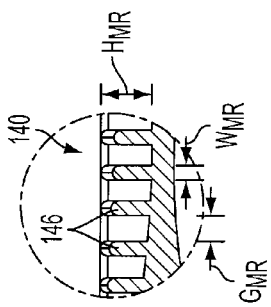
FIG. 16A
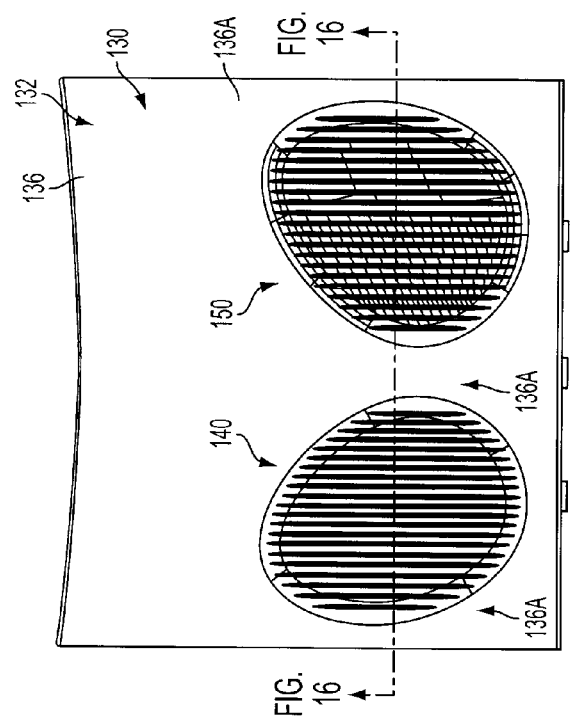
FIG. 15
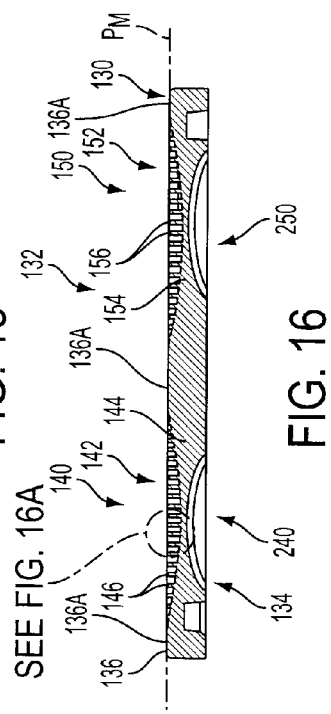
FIG. 16

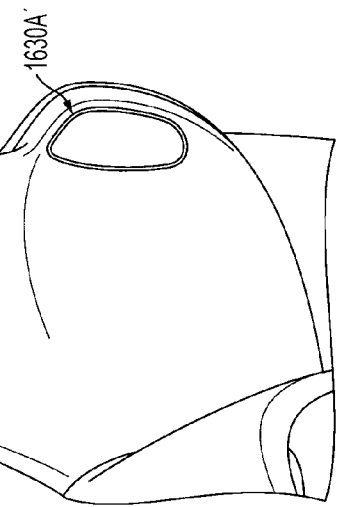
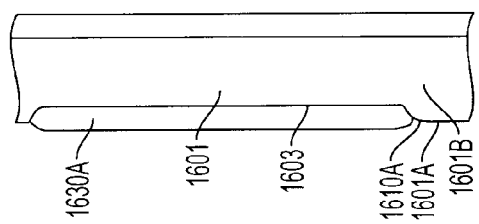
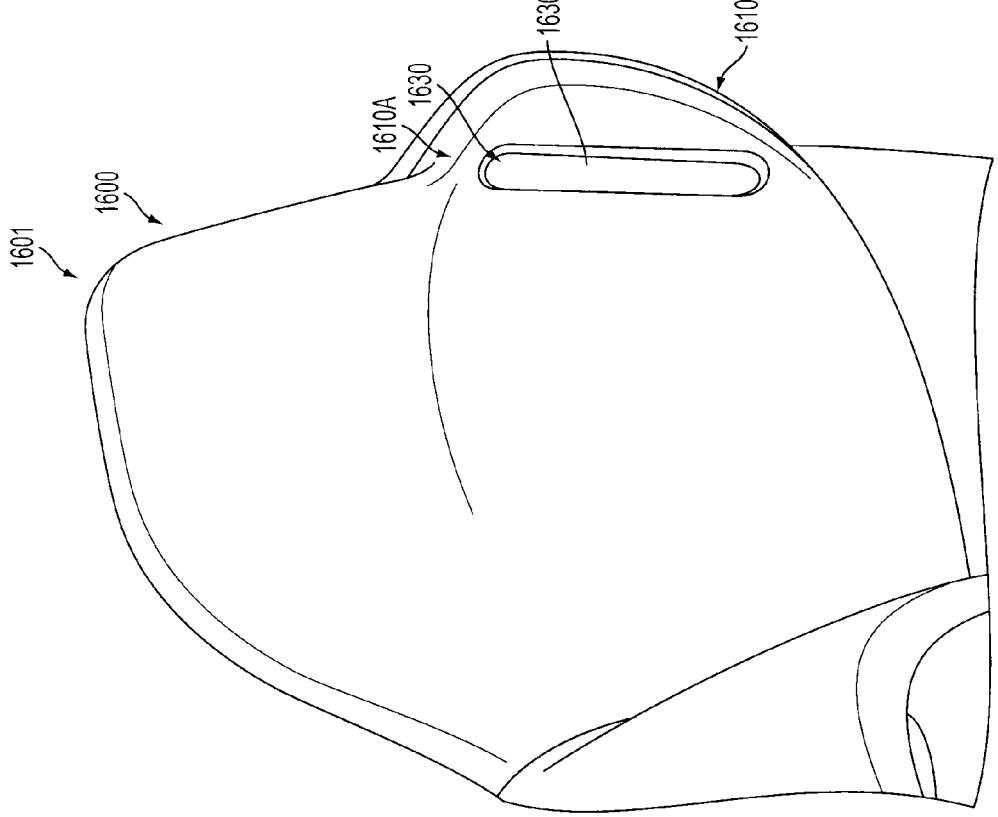
FIG. 22
FIG. 21A
FIG. 21

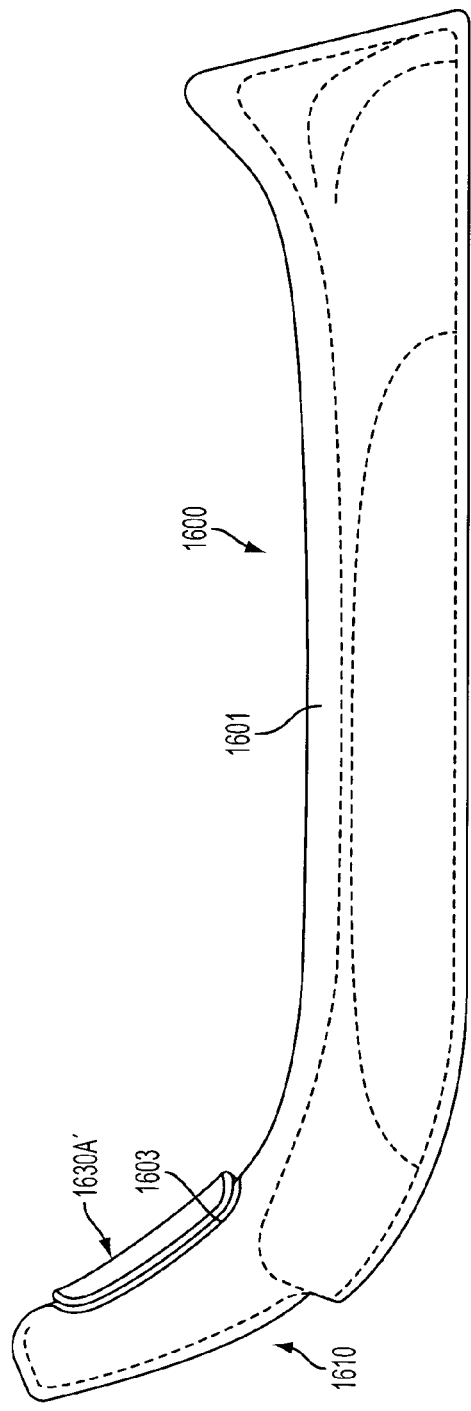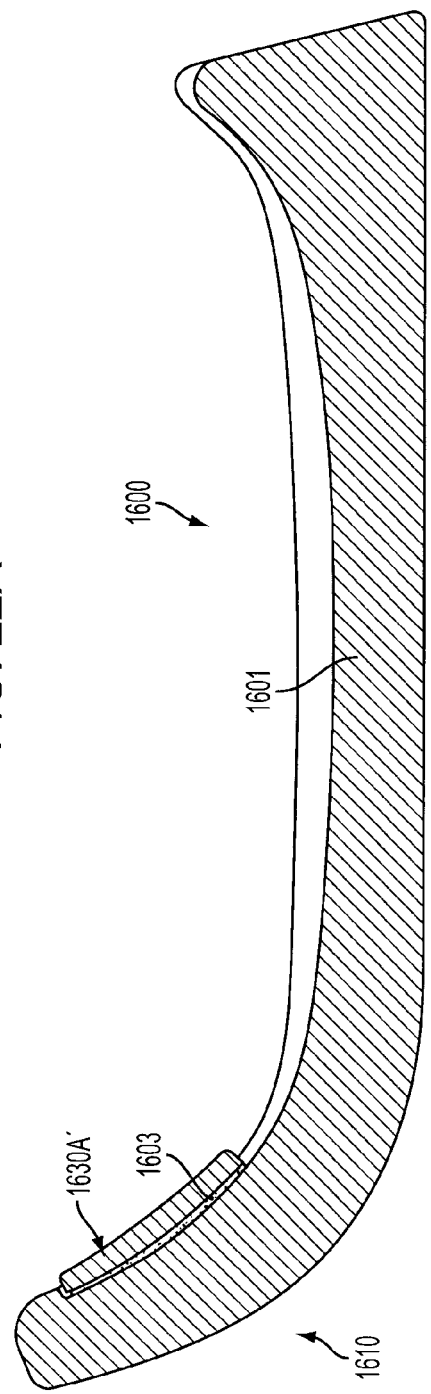
FIG. 22A
FIG. 22B

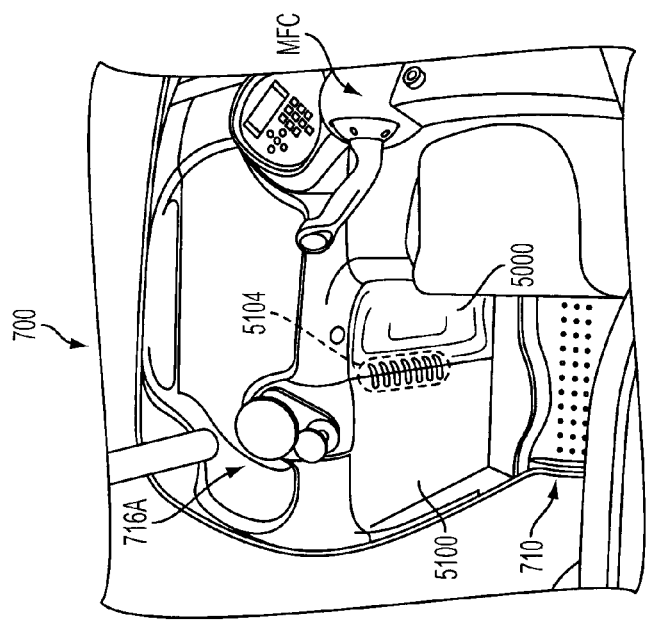
FIG. 26
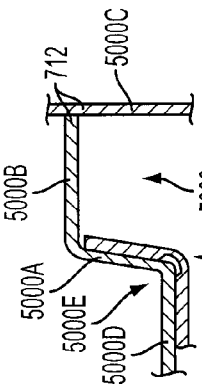
FIG. 26A
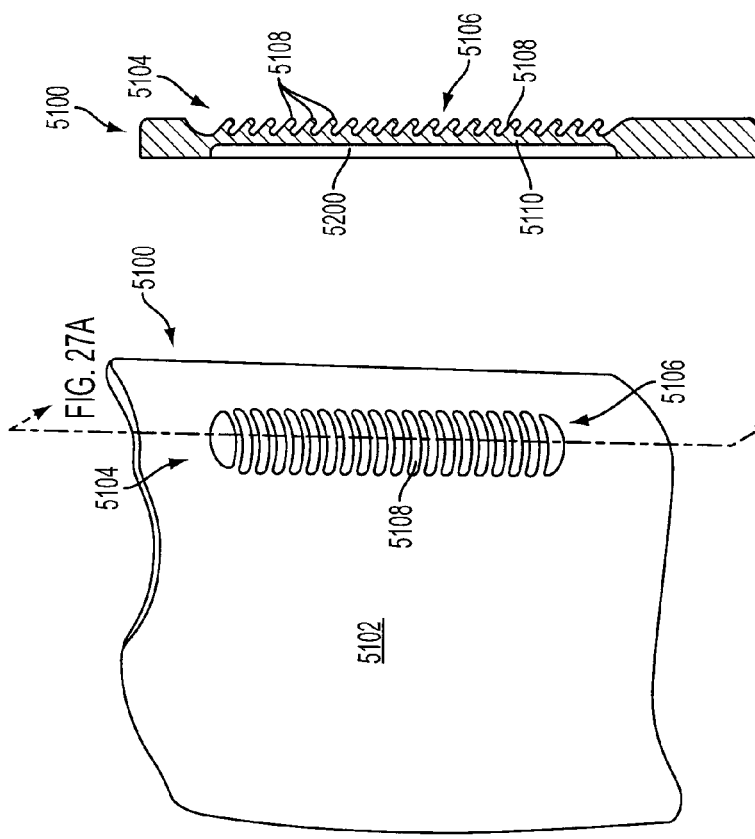
FIG. 27
FIG. 27A

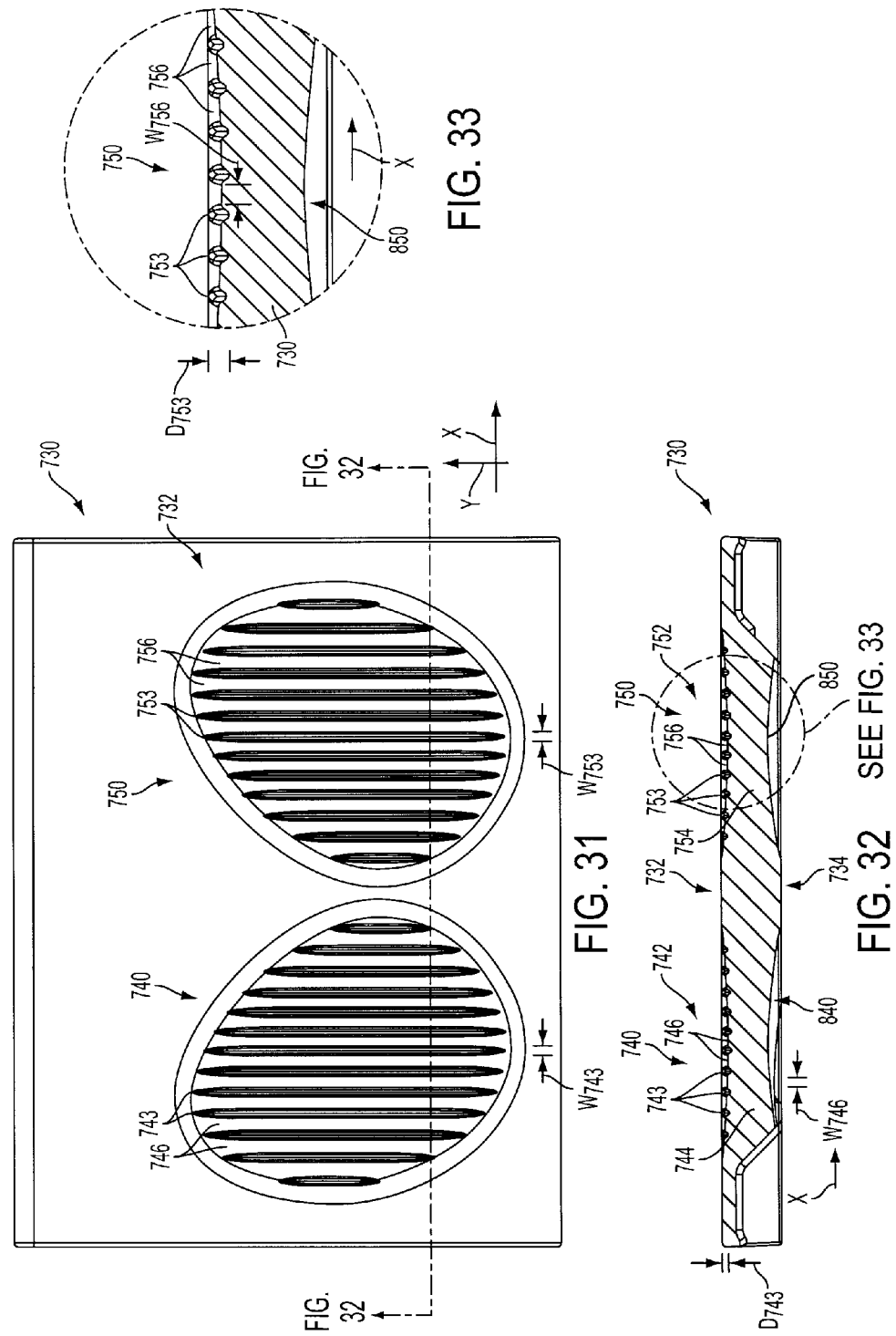

OPERATOR BACKREST AND KNEE SUPPORT PAD FOR A MATERIALS HANDLING VEHICLE

This application claims the benefit of U.S. Provisional Application No. 60/764,882, filed Feb. 3, 2006 and entitled "OPERATOR BACKREST AND KNEE SUPPORT PAD FOR A MATERIALS HANDLING VEHICLE," and U.S. Provisional Application No. 60/864,211, filed Nov. 3, 2006, entitled "OPERATOR BACKREST AND KNEE SUPPORT PAD FOR A MATERIALS HANDLING VEHICLE," the disclosures of which are incorporated herein by reference.

BACKGROUND OF THE INVENTION

It is known to provide a backrest in a walk-through operator compartment for a materials handling vehicle. In some prior art vehicles, the backrest is provided with side bolsters that extend outward. The side bolsters have been found to be disadvantageous as they narrow the pathway through the walk-through operator compartment and hence make operator movement through the operator compartment more difficult.

A support pad for a vehicle such as a pallet truck is disclosed in U.S. Pat. No. 6,948,739 B2, the disclosure of which is incorporated herein by reference.

There is a need for an improved backrest for use in a materials handling vehicle having a walk-through operator compartment.

SUMMARY OF THE INVENTION

In accordance with the present invention, an operator backrest is provided for a materials handling vehicle having a walk-through operator compartment wherein the backrest may not include one or more side bolsters. Instead, the backrest is defined by a primary support pad having a generally curvilinear surface wherein the outer side portions extend at an angle to a plane generally tangent with a center portion of the support pad at angle less than about 45 degrees. Hence, the side portions do not substantially hinder operator movement through the walk-through operator compartment. Further, gripping structure is provided in the side portions of the primary support pad to grip an operator's back/hips during vehicle movement, including movement of the vehicle through a turn.

Further in accordance with the present invention, an operator backrest is provided for a materials handling vehicle having an operator compartment with a single entrance into the compartment. The backrest may have at least one bolster near the entrance into the compartment. Preferably incorporated into the bolster is gripping structure for gripping an operator during vehicle movement.

In accordance with a first aspect of the present invention, an operator backrest in combination with a materials handling vehicle is provided. The backrest may comprise a primary support pad and gripping structure located in at least one side portion of the primary support pad. The gripping structure may be substantially even with or extend above a surface of a portion of the primary support pad surrounding the gripping structure for engagement with an operator positioned on the materials handling vehicle.

The gripping structure may be formed integral with the primary support pad. Alternatively, the gripping structure may be formed separate from the primary support pad.

The gripping structure may comprise at least one geometric element having a generally circular, generally rectangular, generally elliptical, or generally L-shaped shape.

It is also contemplated that the gripping structure may comprise a first main body having a first base section and a plurality of first elements which are flexible relative to the first base section. The first main body may be located in a first side portion of the primary support pad. The first side portion may be curvilinear.

The primary support pad may further include a central portion. The first side portion may extend relative to a plane generally tangent with the central portion at an angle greater than about 45 degrees.

The gripping structure may further comprise a second main body having a second base section and a plurality of second elements which are flexible relative to the second base section. The second main body may be located in a second side portion of the primary support pad. The second side portion may be curvilinear. Each of the first and second side portions may extend relative to a plane generally tangent with a central portion at an angle less than about 45 degrees.

In accordance with a second aspect of the present invention, a materials handling vehicle is provided comprising a walk-through operator compartment. The operator compartment may comprise opposing first and second walls and a backrest associated with the first wall. The backrest may comprise a primary support pad and gripping structure located in at least one side portion of the primary support pad. The gripping structure may be substantially even with or extend above a surface of a portion of the primary support pad surrounding the gripping structure for engagement with an operator positioned on the materials handling vehicle.

The gripping structure may comprise at least one geometric element having a generally circular, generally rectangular, generally elliptical, or generally L-shaped shape.

It is also contemplated that the gripping structure may comprise a first main body located in a first side portion of the primary support pad and a second main body located in a second side portion of the primary support pad. The first main body may have a first base section and a plurality of first elements which are flexible relative to the first base section, and the second main body may have a second base section and a plurality of second elements which are flexible relative to the second base section.

The primary support pad may further include a central portion. Each of the first and second side portions may extend relative to a plane passing through the central portion at an angle less than about 45 degrees.

The operator compartment may further comprise a first knee support pad associated with the second wall comprising a first main body having a first base section and a plurality of first elements. The first elements may be flexible relative to the first base section. Alternatively, the first elements may be substantially non-flexible in at least one direction and separated from one another by recesses.

The operator compartment may further comprise a second knee support pad associated with the second wall comprising a second main body having a second base section and a plurality of second elements which are flexible relative to the second base section.

In accordance with a third aspect of the present invention, a materials handling vehicle is provided comprising an operator compartment with a single entrance into and out of the operator compartment. The operator compartment may comprise a backrest comprising a primary support pad and gripping structure located in at least one side portion of the primary support pad. The gripping structure may be substantially even with or extend above a surface of a portion of the primary support pad surrounding the gripping structure for engagement with an operator positioned on the materials handling vehicle.

The gripping structure may comprise at least one geometric element having a generally circular, generally rectangular, generally elliptical, or generally L-shaped shape.

It is also contemplated that the gripping structure may comprise a main body having a base section and at least one element which is flexible relative to the base section. The main body may be located in a first side portion of the primary support pad.

The first side portion may be positioned near the operator compartment entrance.

In accordance with a fourth aspect of the present invention, a materials handling vehicle is provided comprising a walk-through operator compartment comprising opposing first and second walls. A first knee support pad is associated with one of the first and second walls. The support pad comprises a first main body having a first base section and a plurality of first elements which are substantially non-flexible relative to the first base section. The first elements are separated from one another by recesses.

The first base section is shaped to define a recess such that the first main body functions as a leaf spring to absorb and attenuate forces applied by an operator's knee against the first main body.

The operator compartment may further comprise a second knee support pad associated with the one wall comprising a second main body having a second base section and a plurality of second elements which are substantially non-flexible relative to the second base section. The second elements are separated from one another by recesses.

In accordance with a fifth aspect of the present invention, a materials handling vehicle is provided comprising a vehicle main body and a kneepad. The vehicle main body includes a knee recess in an operator compartment for receiving an operator's knee. The knee recess may be defined by at least two walls that meet at a corner section. The kneepad has a corner portion positioned to cover a corner section of the vehicle main body. The corner portion comprises a pad main body including a base section and a plurality of first elements which are flexible relative to the base section.

The pad main body may be configured to define a pocket such that the pad main body functions as a leaf spring to absorb and attenuate forces applied by an operator's knee against the pad main body.

The first elements comprise ribs. The ribs may extend at an angle to a horizontal plane of from about 10 degrees to about 60 degrees.

BRIEF DESCRIPTION OF THE DRAWINGS

FIG. 6 is a front view of the operator backrest illustrated in FIG. 3;

FIG. 7 is a cross sectional view taken along view line 7-7 in FIG. 6;

FIG. 7A is an enlarged view of a portion of the operator backrest illustrated in FIG. 7;

FIG. 15 is a view of a front side of the mat provided with knee support pads illustrated in FIG. 14;

FIG. 16 is a cross sectional view taken along section line 16-16 in FIG. 15;

FIG. 16A is an enlarged view of a portion of the mat illustrated in FIG. 16;

FIG. 17 is a view of the back side of the mat illustrated in FIG. 14;

FIG. 21 is a perspective view of a backrest constructed in accordance with yet a further embodiment of the present invention;

FIG. 21A is a cross sectional view of the backrest illustrated in FIG. 21;

FIG. 22 is a perspective view of a backrest constructed in accordance with a still further embodiment of the present invention;

FIG. 22A is a top view of the backrest illustrated in FIG. 22;

FIG. 22B is a cross sectional view of the backrest illustrated in FIG. 22;

FIG. 26 is a top view of an operator compartment of the truck illustrated in FIG. 18;

FIG. 26A is a cross sectional view of structure forming a knee recess in the operator compartment illustrated in FIG. 26;

FIG. 27 is a perspective view of kneepad provided in the operator compartment illustrated in FIG. 26;

FIG. 27A is a sectional view taken along section line 27A-27A in FIG. 27;

FIG. 31 is a front view of the mat illustrated in FIG. 29;

FIG. 32 is a cross sectional view taken along section line 32-32 in FIG. 31;

FIG. 33 is an enlarged portion of the mat illustrated in FIG. 32;

DETAILED DESCRIPTION OF THE INVENTION

Figure 1:
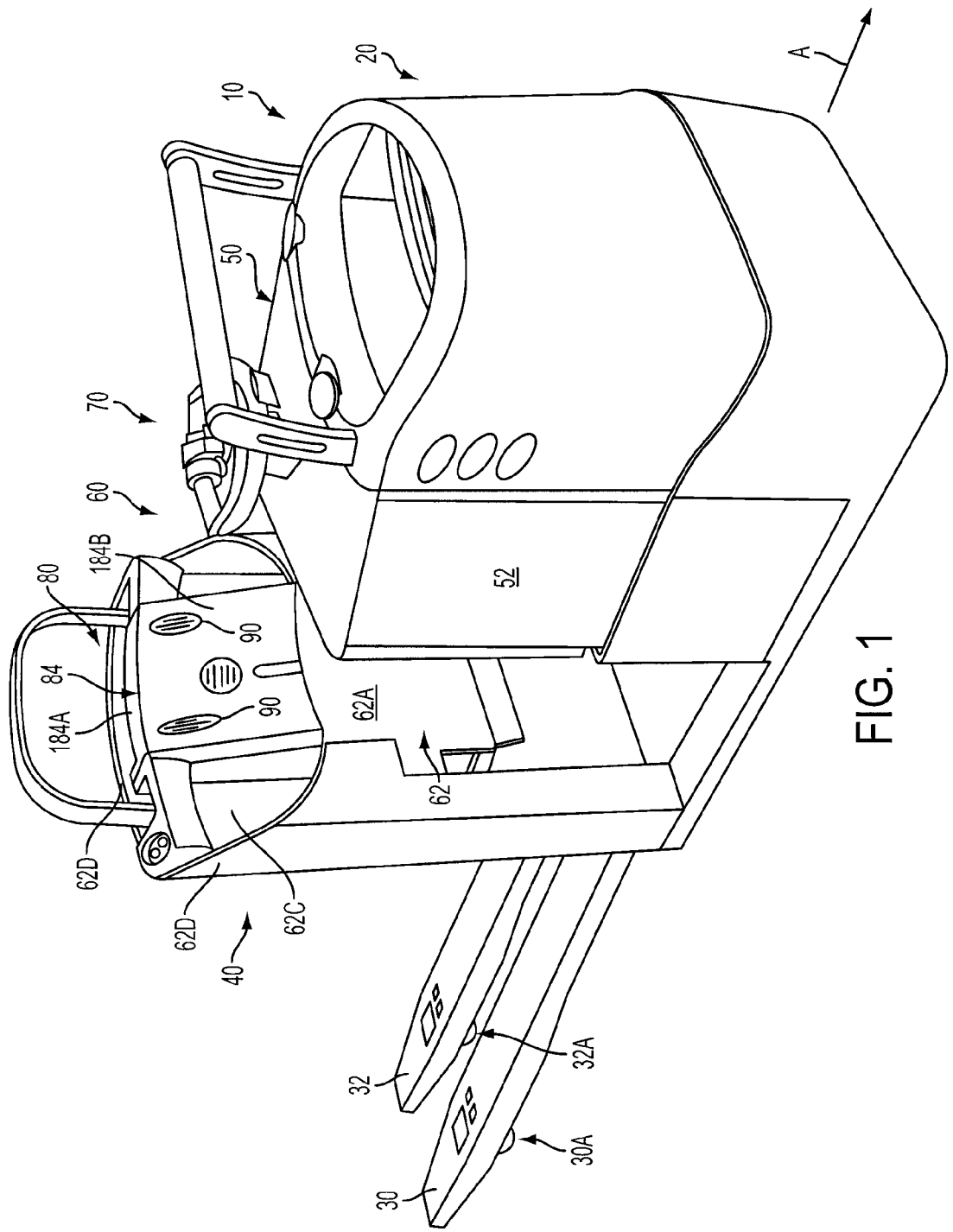
FIG. 1 is a perspective view of a materials handling vehicle including an operator backrest and a mat provided with knee support pads constructed in accordance with the present invention.
Figure 2:
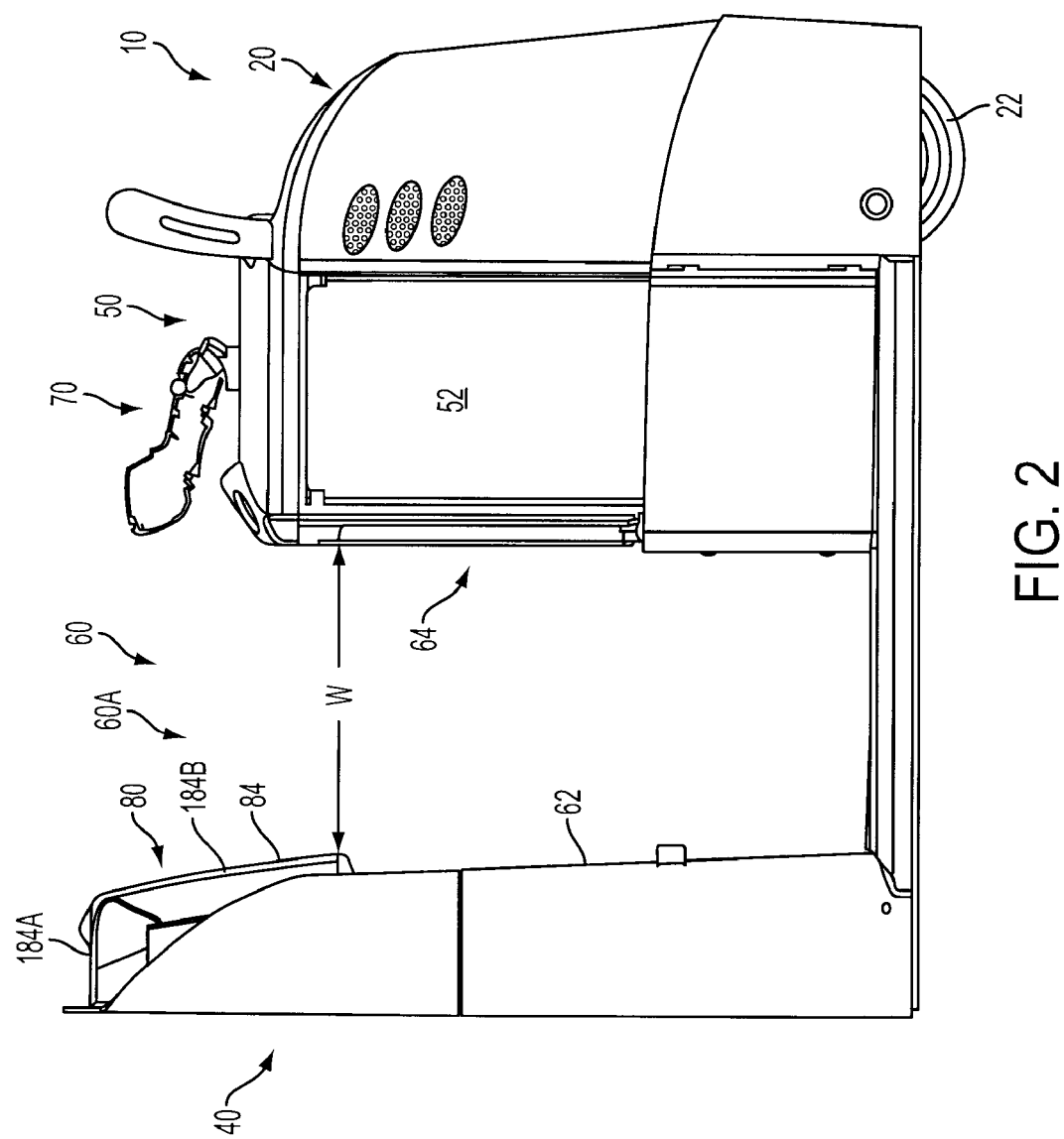
FIG. 2 is a side view of a load backrest, power unit and battery compartment of the materials handling vehicle illustrated in FIG. 1 with forks not shown.
Figure 3:
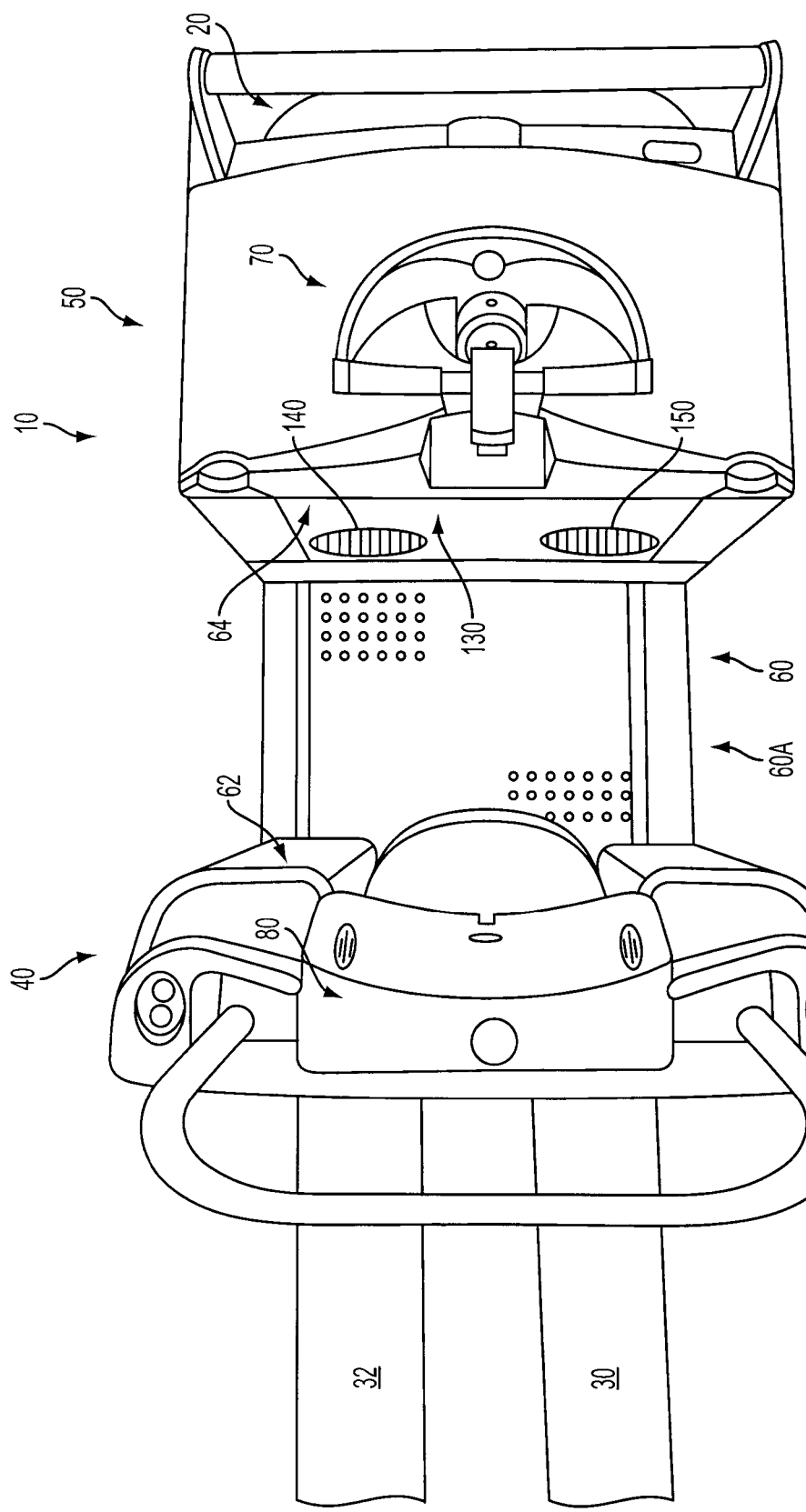
FIG. 3 is a top view of the vehicle illustrated in FIG. 1.

Referring now to FIG. 1, a materials handling vehicle comprising a low level order picker 10 is illustrated. The vehicle 10 comprises a power unit 20 containing a traction motor/brake assembly (not shown) coupled to a drive wheel 22, see FIG. 2, for driving and braking the drive wheel 22. The drive wheel 22 is positioned below the power unit 20. A non-driven caster wheel (not shown) is also positioned below the power unit 20. A power steering motor (not shown) is provided in the power unit 20 for turning the drive wheel 22, i.e., to allow the vehicle 10 to be steered. A hydraulic pump/motor (not shown) is also housed within the power unit 20 for providing pressurized hydraulic fluid to a piston/cylinder unit (not shown) for raising and lowering first and second forks 30 and 32 relative to a load backrest 40. The forks 30 and 32 are illustrated in FIGS. 1 and 3 but are not shown in FIGS. 2, 4 and 5. A load wheel assembly 30A, 32A is coupled to each fork 30, 32. A battery compartment 50 houses a battery 52 and is provided adjacent the power unit 20. The battery 52 provides power to the traction motor/brake assembly, the power steering motor, and the hydraulic pump/motor. A walk-through operator compartment 60 is positioned between the battery compartment 50 and the load backrest 40. An operator, when positioned within the operator compartment 60, may control the speed, braking and direction of the vehicle 10 and the height of the forks 30 via a control handle structure 70.

The operator compartment 60 may comprise opposing first and second walls 62 and 64 and a backrest 80 coupled to the first wall 62, see FIGS. 1-5. In the illustrated embodiment, the backrest 80 comprises a primary support pad 84 having upper and lower sections 184A and 184B integral with one another. The backrest 80 further comprises gripping structure 90 located in first and second side portions 84A and 84B of the lower section 184B of the support pad 84, see FIGS. 5 and 6.

Figure 11:
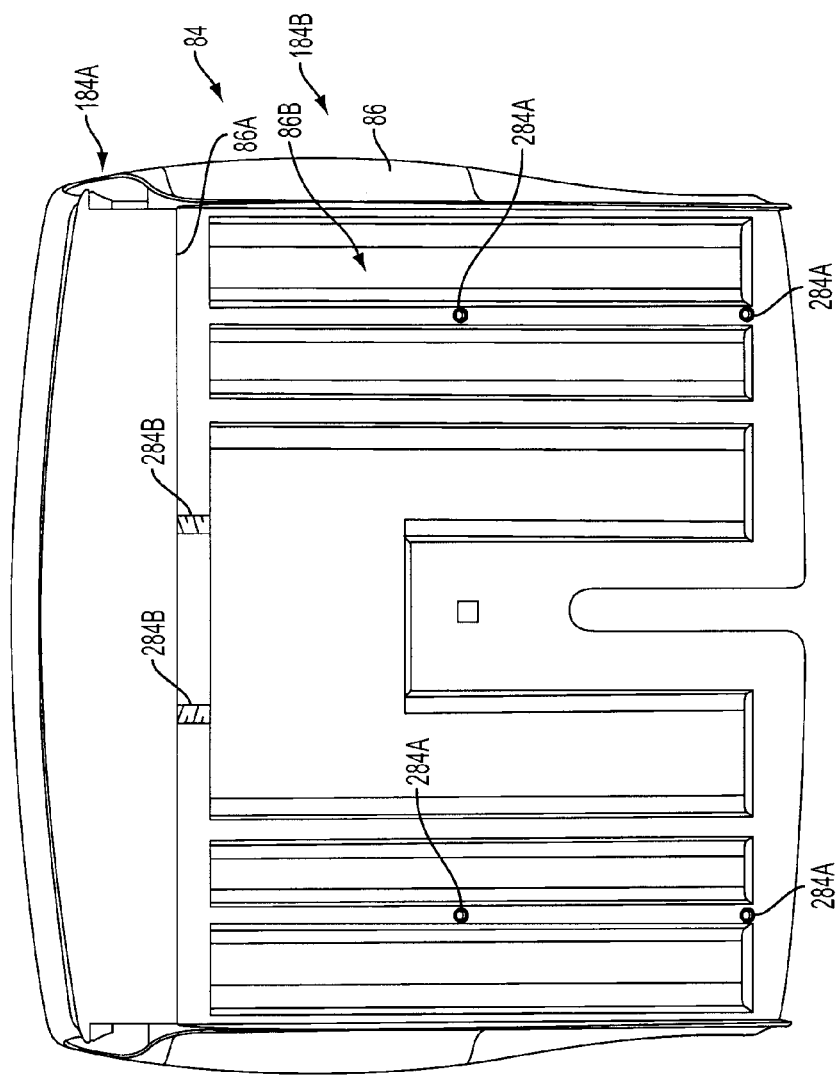
FIG. 11 is a rear view of an operator backrest constructed in accordance with a first embodiment of the present invention including nuts and bolts for securing the backrest to a first wall of a materials handling vehicle.

In accordance with a first embodiment of the present invention, the primary support pad 84 includes an inner surface 86 having four molded-in threaded inserts or nuts 284A and two molded-in studs or bolts 284B, see FIG. 11. The nuts 284A are molded into an inner surface 86B of the lower section 184B of the support pad 84 while the bolts 284B are molded into an inner surface 86A of the upper section 184A of the support pad 84, see also FIG. 12A. The first wall 62 of the operator compartment 60 includes a center plate 62A, side plates 62B and 62C joined to the center plate 62A and a back plate 62D that defines a back of the backrest 80 and curves around to define backrest sides and joins with the side plates 62B and 62C, see FIGS. 1, 5 and 12. A bracket 62E is coupled to a horizontal plate 62F, which, in turn, is coupled to the back plate 62D, see FIG. 12A. The upper section 184A of the primary support pad 84 is connected to the bracket 62E via nuts 284C coupled to the bolts 284B molded into and extending down from the upper section 184A of the support pad 84. The lower section 184B of the support pad 84 is connected to the center plate 62A via bolts 284D which pass through the center plate 62A and threadedly engage the nuts 284A molded into the lower section 184B.

Figure 12A:
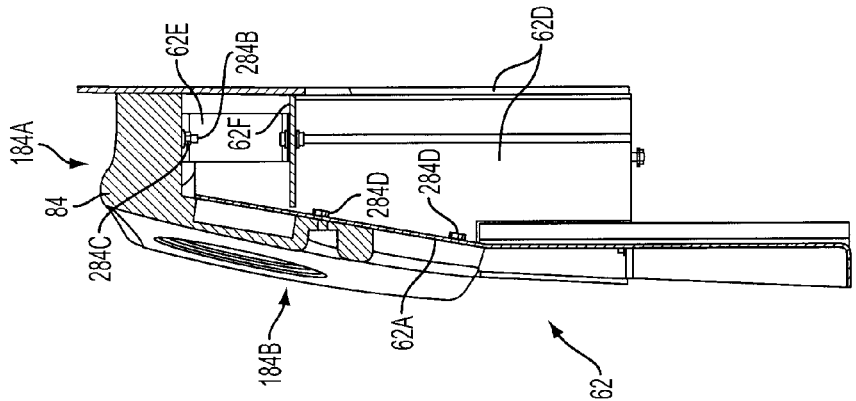
FIG. 12A is a view taken along view line 12A-12A in FIG. 12.
Figure 12:
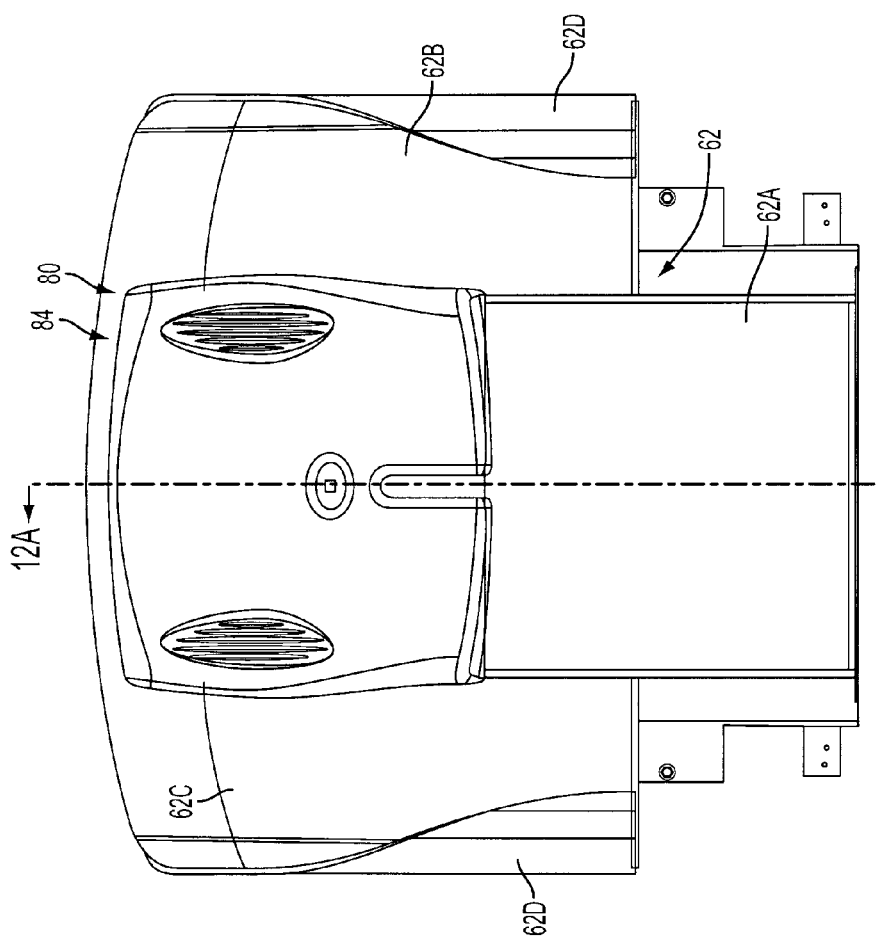
FIG. 12 is a front view of the operator backrest illustrated in FIG. 11 coupled to a first wall of a materials handling vehicle.
Figure 13A:
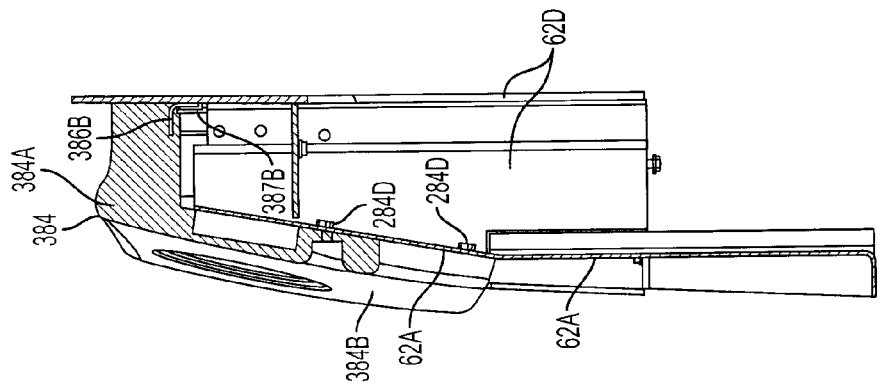
FIG. 13A is a view taken along view line 13A-13A in FIG. 13.
Figure 13:
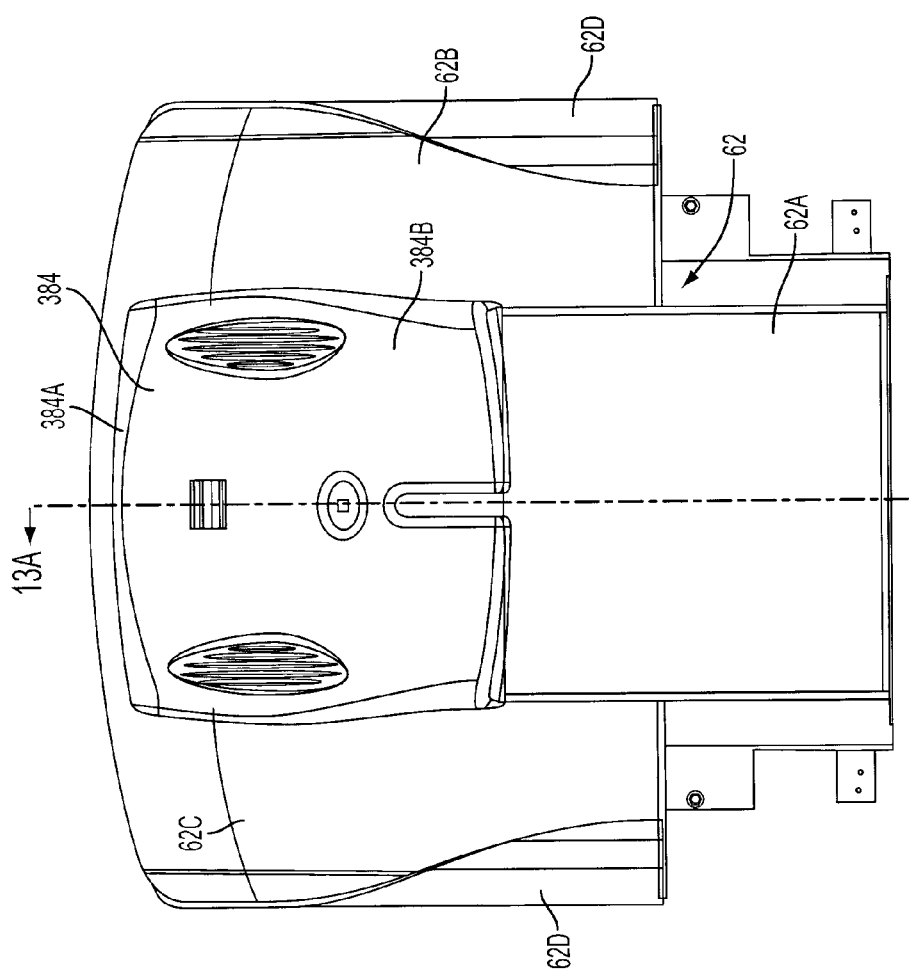
FIG. 13 is a front view of an operator backrest constructed in accordance with a second embodiment of the present invention including clips for securing the backrest to a first wall of a materials handling vehicle.
Figure 13B:
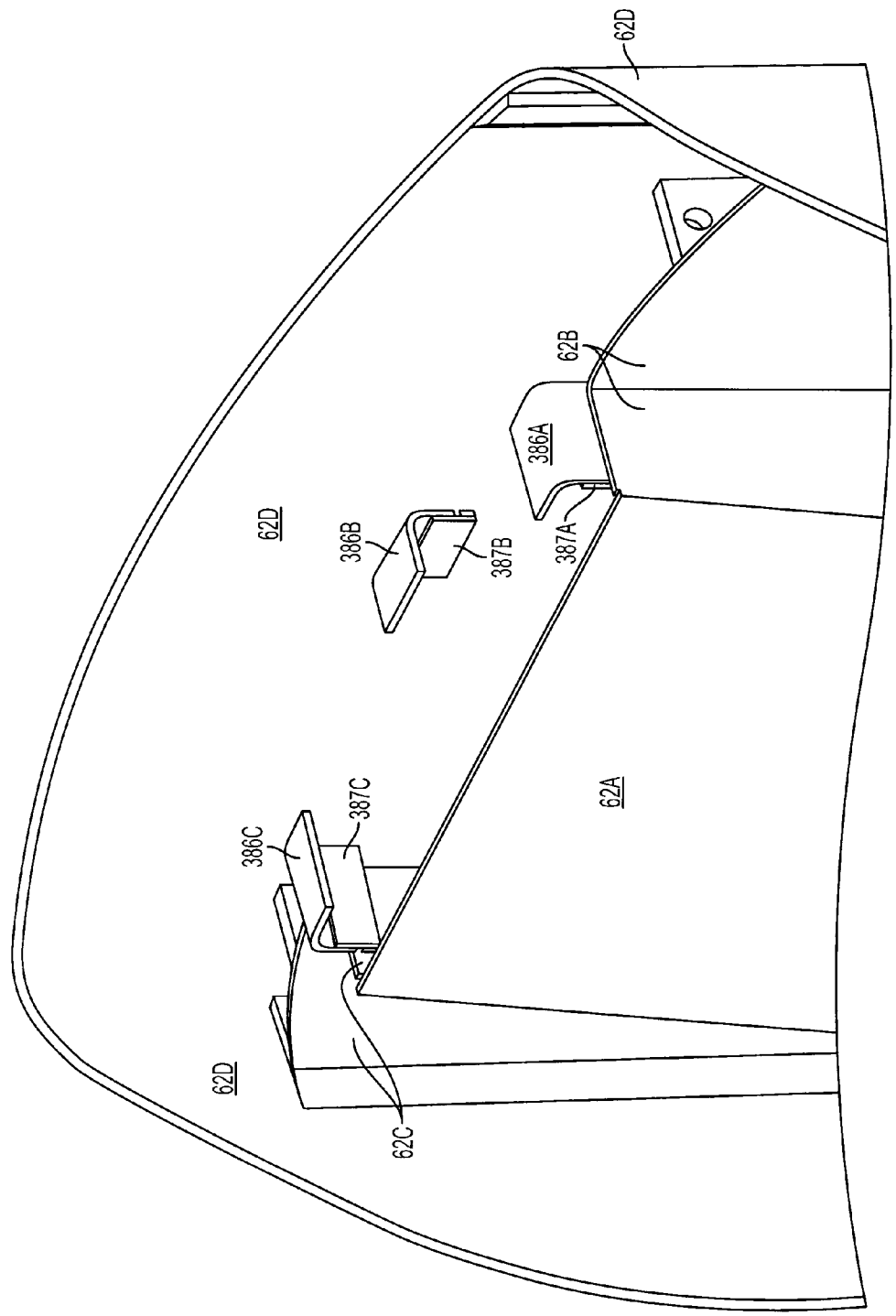
FIG. 13B is a perspective view of back and side plates of a first wall of a materials handling vehicle including brackets for receiving clips molded into a support pad of the operator backrest illustrated in FIG. 13, wherein the clips are illustrated but the upper section of the support pad is not illustrated.

In accordance with a second embodiment of the present invention, the primary support pad 384 is formed in substantially the same manner as the support pad 84 illustrated in FIGS. 11, 12 and 12A, except that it includes three molded-in clips 386A-386C instead of molded-in studs or bolts 284B for securing the upper section 384A of the support pad 384 to first wall 62, see FIGS. 13, 13A and 13B. Each clip 386A-386C has an L shape, see FIG. 13B. The upper section 384A of the support pad 384 is not illustrated in FIG. 13B. The clip 386A engages a corresponding bracket 387A coupled to the side plate 62B, the clip 386B engages a corresponding bracket 387B, see FIGS. 13A and 13B, secured to the back plate 62D and the clip 386C engages a corresponding bracket 387C coupled to the side plate 62C. As in the embodiment illustrated in FIG. 11, the support pad 384 includes nuts 284A molded into an inner surface of the lower section 384B of the support pad 384. Hence, the upper section 384A of the primary support pad 384 is coupled to the side plates 62B and 62C and the back plate 62D via the clips 386A-386C engaging corresponding brackets coupled to the side plates 62B and 62C and the back plate 62D. The lower section 384B of the support pad 84 is connected to the center plate 62A via bolts 284D which pass through the center plate 62A and threadedly engage the nuts molded into the lower section 384B.

Figure 4:
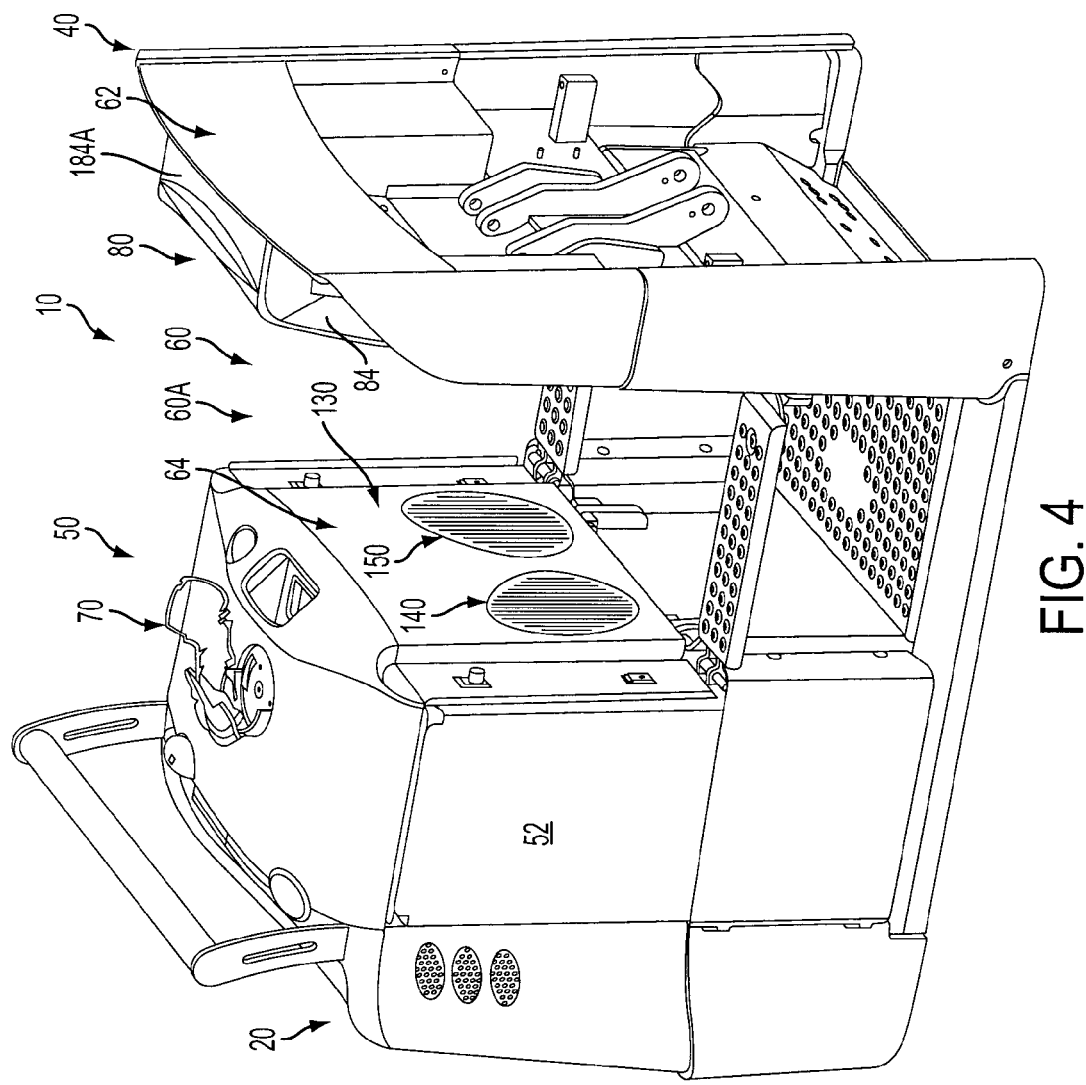
FIGS. 4 and 5 are perspective views of the load backrest, power unit and battery compartment illustrated in FIG. 2.
Figure 5:
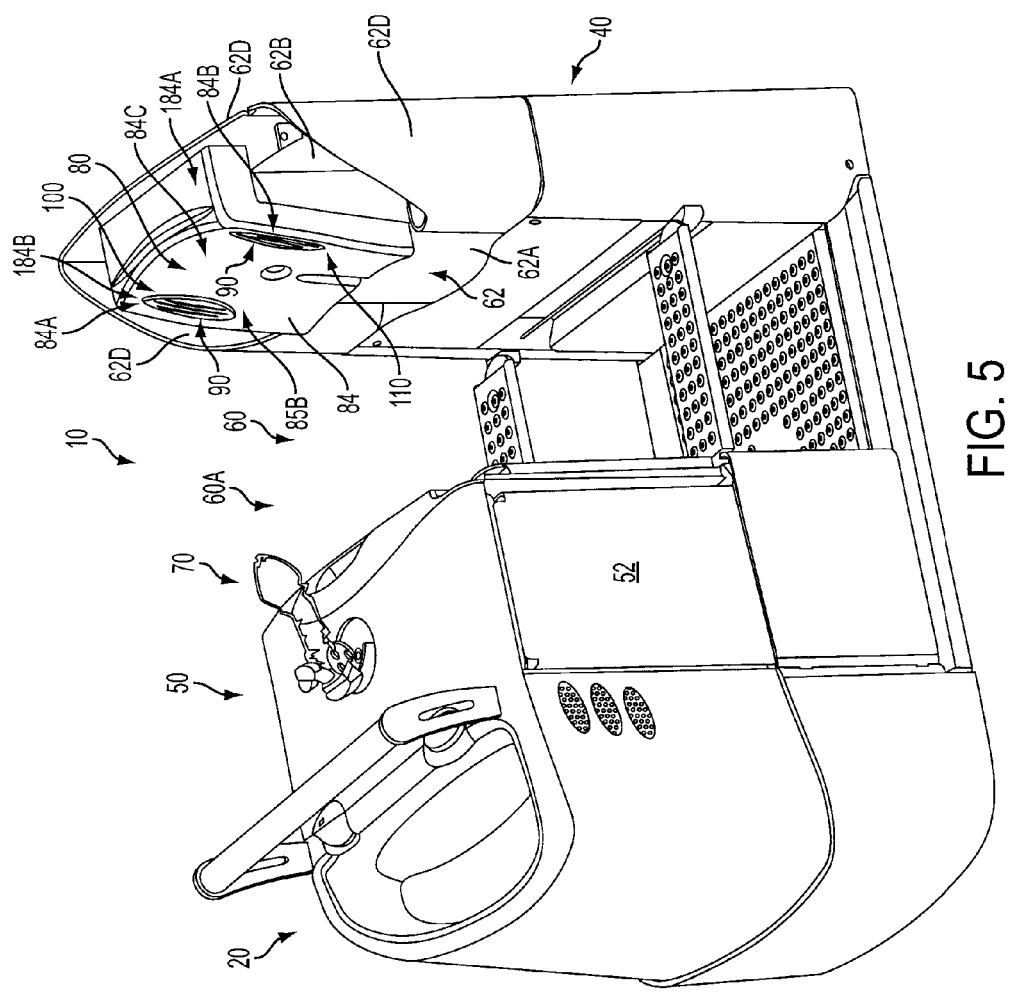
Figure 8A:
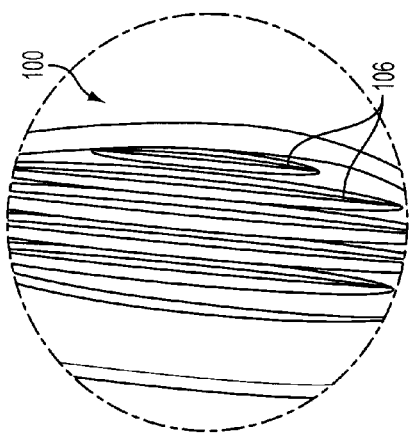
FIG. 8A is an enlarged view of a portion of the operator backrest illustrated in FIG. 8.
Figure 8:
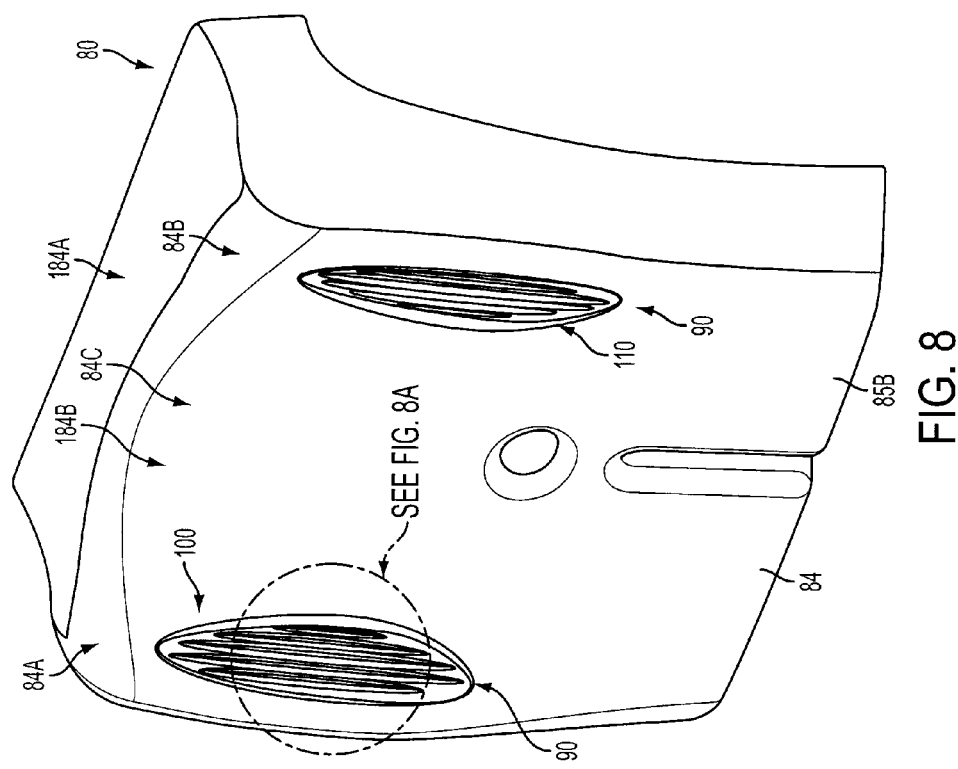
FIG. 8 is a perspective view of the operator backrest illustrated in FIG. 6.

An outer surface 85B of the lower section 184B of the support pad 84 has a generally curvilinear shape, see FIG. 5. A central portion 84C of the lower section 184B of the support pad 84 is positioned between the first and second side portions 84A and 84B. As is apparent from FIG. 7, the first and second side portions 84A and 84B extend at an angle Θ of less than about 45 degrees to a plane P generally tangent with an outer surface 84C' of the central portion 84C of the support pad lower section 184B. Hence, the side portions 84A and 84B extend only minimally into an open area 60A defined between the first and second walls 62 and 64 of the operator compartment 60, see FIGS. 2-5. For example, the open area 60A may have a width W extending from the support pad 84 to the second wall 64 that falls within the range of from about 400 mm to about 600 mm and preferably is about 475 mm, see FIG. 2. Consequently, the side portions 84A and 84B of the support pad lower section 184B do not substantially hinder operator movement into and out of the walk-through operator compartment 60.

The inner surface 86B of the lower section 184B of the support pad 84 includes first, second, third and fourth support ribs 186A-186D, see FIG. 7, which engage the center plate 62A when the pad 84 is mounted to the first wall 62. A recess 186E is defined between the second and third support ribs 186B and 186C to allow the support pad 84 to be somewhat flexible in the central portion 84C so as to improve operator comfort when an operator leans against the support pad 84.

In the illustrated embodiment, the gripping structure 90 comprises first and second main bodies 100 and 110, respectively, see FIGS. 5-10. The first main body 100 is located in the first side portion 84A of the support pad lower section 184B while the second main body 110 is located in the second side portion 84B of the support pad lower section 184B. In the illustrated embodiment, the first and second main bodies 100 and 110 are formed integral with the support pad 84. However, it is contemplated that the first and second main bodies 100 and 110 may comprise separate elements coupled by adhesive, fasteners or the like to the support pad 84.

The first main body 100 comprises inner and outer surfaces 102 and 104, respectively, see FIGS. 6 and 7. The inner surface 102 faces toward the center plate 62A while the outer surface 104 is visible by the operator. The first main body 100 further includes a plurality of first elements 106, ribs in the illustrated embodiment, which are flexible relative to a first base section 108 of the first main body 100. The ribs 106 may have a length $L_{R1}$ (the length $L_{R1}$ of only one rib 106 is designated in FIG. 6) in a Y direction which falls within a range of from about 60 mm to about 170 mm, see FIG. 6. The ribs 106 may also have a width $W_{R1}$ (the width $W_{R1}$ of only one rib 106 is designated in FIG. 6) in an X direction of between about 4 mm and about 6 mm. A gap $G_{R1}$ (only a single gap $G_{R1}$ between a pair of adjacent ribs 106 is designated in FIG. 7) between adjacent ribs 106 in the X direction may have a dimension of between about 4 mm and about 6 mm. The ribs 106 may have a height extending from the first base section 108 that falls within a range of from about 1 mm to about 10 mm. Preferably, the ribs 106 are substantially even with or extend above a portion 84D of the support pad 84 surrounding the first main body 100. For example, the ribs 106 may extend from about 0 mm to about 6 mm above portion 84D. Due to their shape and size, the ribs 106 are adapted to engage an operator's back and/or hip when an operator engages, i.e., leans against, the backrest 80. When the operator is engaged with the backrest 80 during vehicle travel, including vehicle turns, the ribs 106 assist in maintaining the operator within the operator compartment 60. This is especially true when an operator pushes against the control handle structure 70 so as to push his/her back/hips into the support pad 84.

The second main body 110 comprises inner and outer surfaces 112 and 114, respectively, see FIGS. 6 and 7. The inner surface 112 faces toward the center plate 62A while the outer surface 114 is visible by the operator. The second main body 110 further includes a plurality of second elements 116, ribs in the illustrated embodiment, which are flexible relative to a second base section 118 of the second main body 110. The ribs 116 may have a length $L_{R2}$ (the length $L_{R2}$ of only one rib 116 is designated in FIG. 6) in a Y direction that falls within a range of from about 60 mm to about 170 mm. The ribs 116 may also have a width $W_{R2}$ (the width $W_{R2}$ of only one rib 116 is designated in FIG. 7A) in an X direction of between about 4 mm and about 6 mm. A gap $G_{R2}$ (only a single gap $G_{R2}$ between a pair of adjacent ribs 116 is designated in FIG. 7) between adjacent ribs 116 in the X direction may have a dimension of between about 4 mm and about 6 mm. The ribs 116 may have a height $H_{R2}$ (the height $H_{R2}$ of only one rib 116 is designated in FIG. 7A) extending from the second base section 118 in a Z direction that falls within a range of from about 1 mm to about 10 mm. Preferably, the ribs 116 are substantially even with or extend above a portion 84E of the support pad 84 surrounding the second main body 110. For example, the ribs 106 extend from about 0 mm to about 6 mm above portion 84E. Due to their shape and size, the ribs 116 are adapted to engage an operator's back and/or hip when an operator engages, i.e., leans against, the backrest 80. When the operator is engaged with the backrest 80 during vehicle travel, including vehicle turns, the ribs 116 assist in maintaining the operator within the operator compartment 60. This is especially true when an operator pushes against the control handle structure 70 so as to push his/her back/hips into the support pad 84.

The primary support pad 84 including the first and second main bodies 100 and 110 may be formed from a polymeric material such as polyurethane via a reaction injection molding operation. The support pad 84 including the first and second main bodies 100 and 110 may also be formed from a synthetic rubber via a compression molding operation. Preferably, the support pad 84 is formed from a material so as to be durable and comfortable to an operator.

The first and second elements 106, 116, rather than being shaped like ribs having a generally oval cross section, may have other geometric shapes, e.g., the ribs may have a generally circular, generally rectangular, generally square, generally elliptical, generally triangular or similar cross section.

Figure 9:
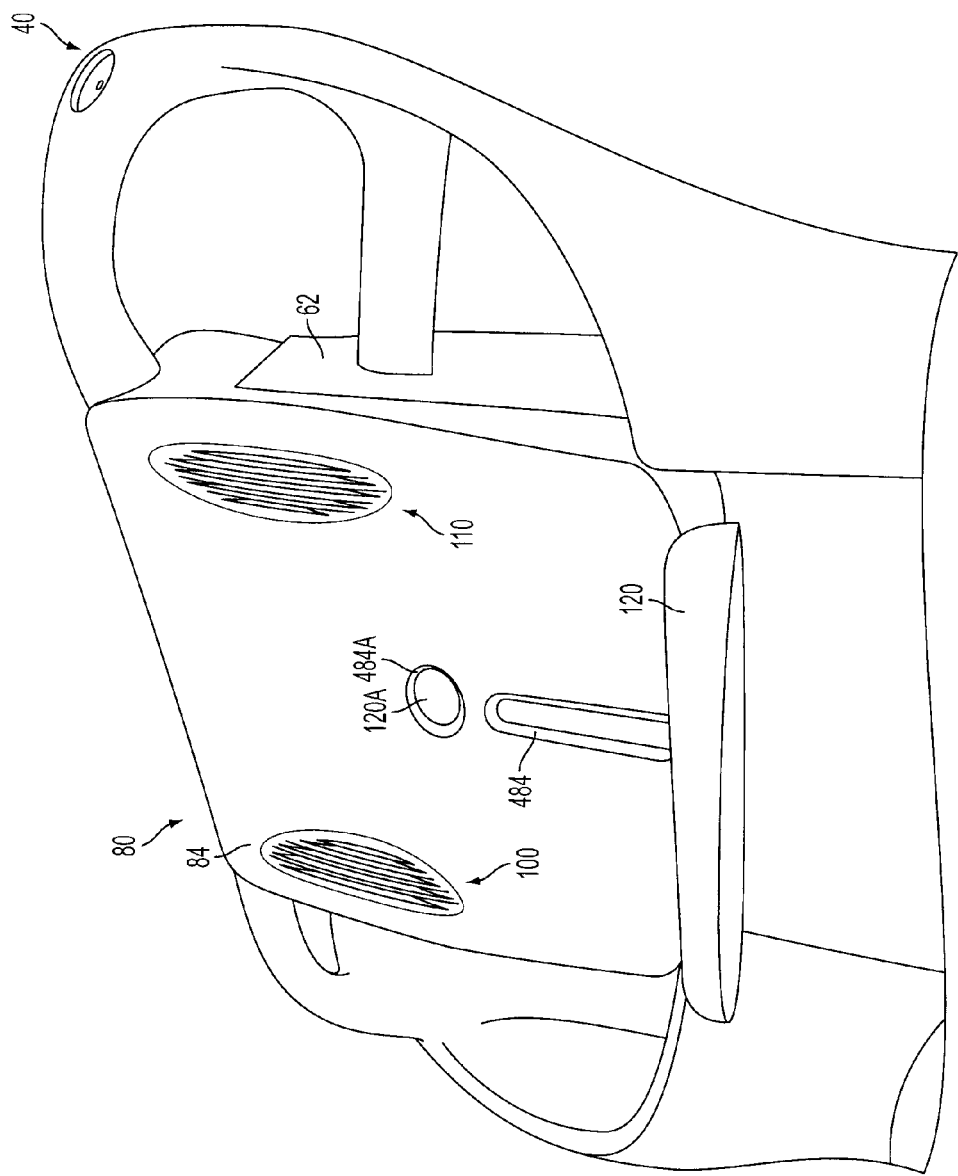
FIG. 9 illustrates an embodiment of a materials handling vehicle including a perch below an operator backrest constructed in accordance with the present invention.
Figure 10:
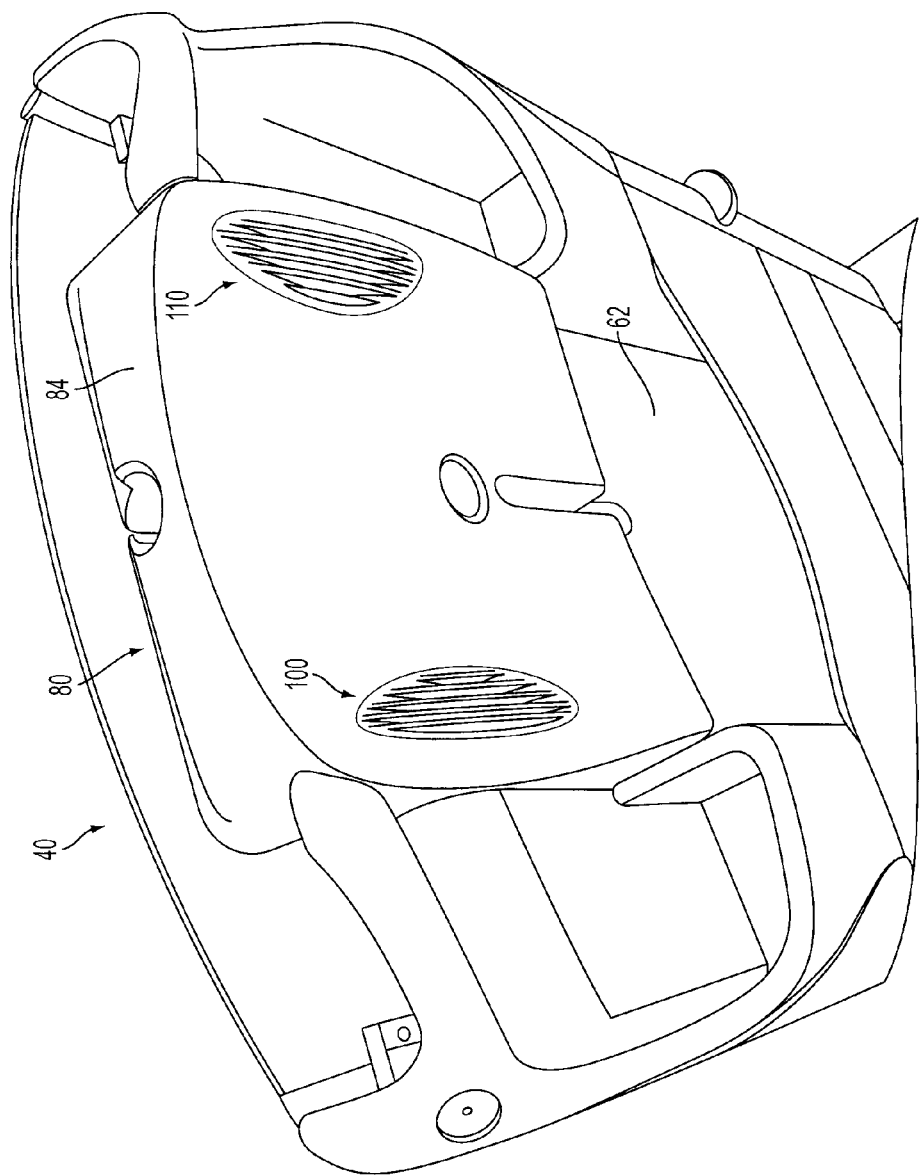
FIG. 10 illustrates an embodiment of a materials handling vehicle with an operator backrest constructed in accordance with the present invention and not including a perch.

In the embodiment illustrated in FIG. 9, a perch or shelf 120 is provided beneath the operator pad 80. In FIG. 9, the perch 120 is shown in its "UP" position. A narrow slot 484 is formed in the support pad 84 to allow a support (not shown) for the perch 120 to move vertically when the perch 120 is adjusted in a vertical direction. When in the "UP" position, an operator may rest against the perch 120 while driving the vehicle 10. The perch 120 may also be pivoted to a "DOWN" position so as to be out of the way to allow an operator to easily move through the walk-through passenger compartment 60. A button 120A extends through an opening 484A in the support pad 84. The button 120A may be engaged by an operator to allow for vertical adjustment and/or pivotable movement of the perch 120. In the embodiment illustrated in FIG. 10, a perch 120 is not provided.

Referring to FIGS. 3 and 4, the second wall 64 of the operator compartment 60 is defined by a polymeric mat 130 having first and second knee support pads 140 and 150, respectively, incorporated therein. That is, the knee support pads 140 and 150 are integral with the polymeric mat 130 in the illustrated embodiment. Alternatively, the knee support pads 140 and 150 may comprise separate elements coupled to the mat 130 via adhesive, fasteners or the like.

Figure 14A:
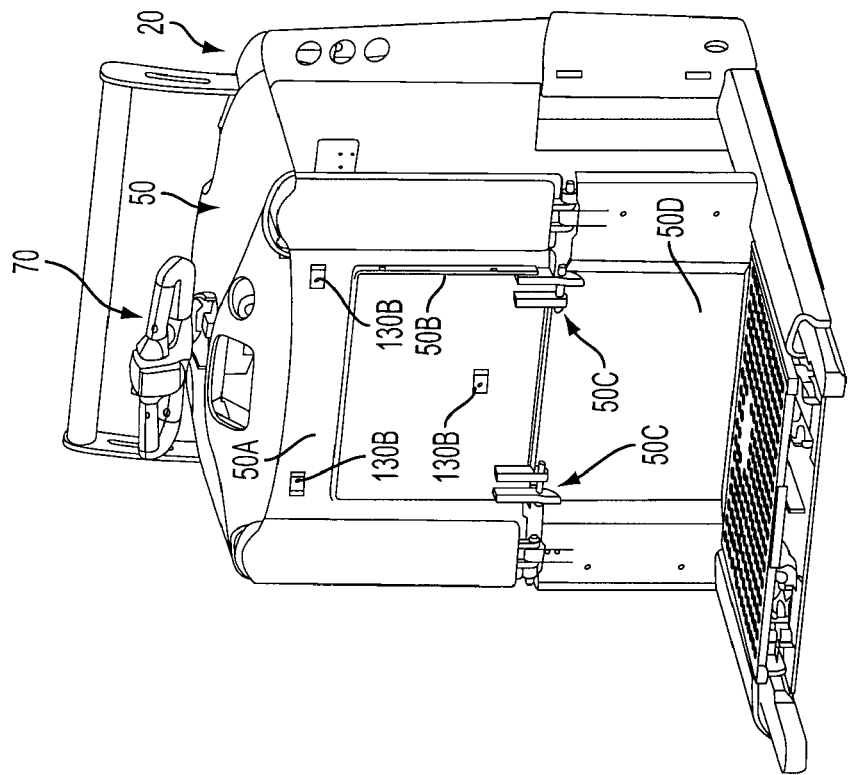
FIG. 14A is a perspective view of the vehicle portion illustrated in FIG. 14 with the mat not shown.
Figure 14:
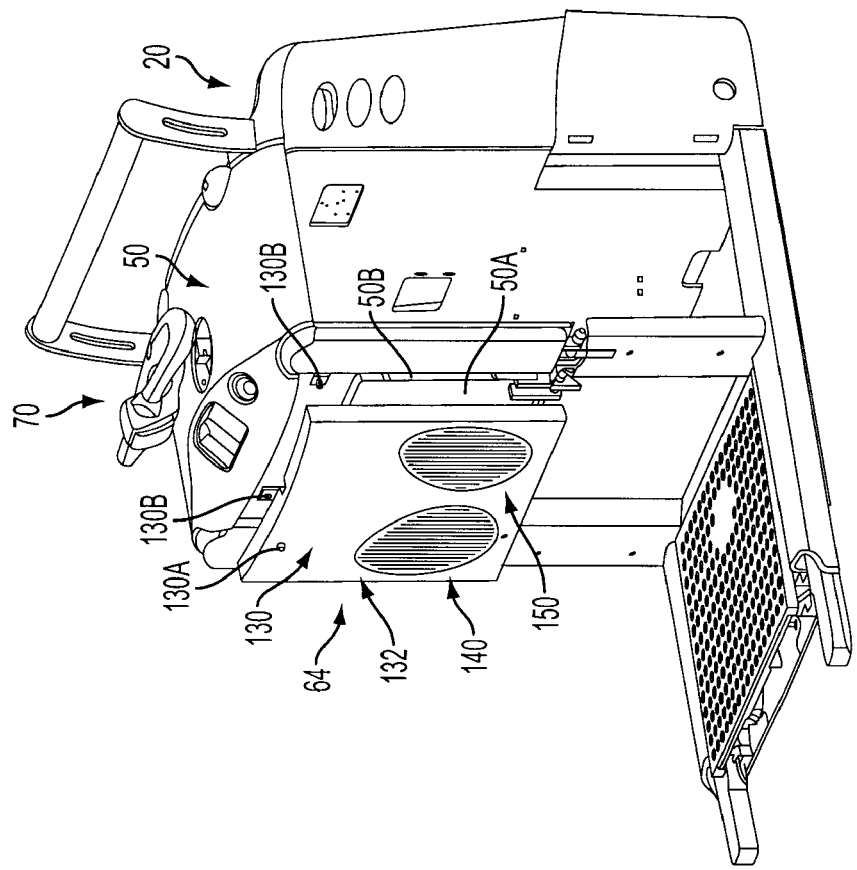
FIG. 14 is a perspective view of a portion of the materials handling vehicle illustrated in FIG. 1 with the mat provided with knee support pads separated from a battery compartment wall.

The mat 130 may include three molded-in threaded inserts or nuts 130A (shown in FIG. 17; only one of which is illustrated in FIG. 14). Bolts 130B extend through a wall 50A of the battery compartment and engage the nuts 130A so as to secure the mat 130 to the battery compartment wall 50A, see also FIG. 14A.

The mat 130 has a front side 132, which is visible to an operator, and a back side 134, which is positioned adjacent to the battery compartment wall 50A, see FIGS. 14, 15 and 17. A channel 134A is formed in the back side 134 of the mat 130 for receiving a wiring harness (not shown) coupled to the control handle structure 70. The channel 134A also receives a U-shaped reinforcement member 50B coupled to the wall 50A. The back side 134 of the mat 130 is also provided with pockets 134B for receiving hinge members 50C associated with the wall 50A, see FIGS. 14A and 17. The hinge members 50C allow the wall 50A to pivot relative to a base wall 50D of the battery compartment 50. Finally, the back side 134 of the mat 130 is provided with first and second recesses 240 and 250 corresponding respectively to the first and second support pads 140 and 150.

The first knee support pad 140 comprises a first main body 142 having a first base section 144 and a plurality of first elements 146, ribs in the illustrated embodiment, which are flexible relative to the first base section 144. The first recess 240 is provided behind the first main body 142. The second knee support pad 150 comprises a second main body 152 having a second base section 154 and a plurality of second elements 156, ribs in the illustrated embodiment, which are flexible relative to the second base section 154. The second recess 250 is defined behind the second main body 152.

Preferably, the ribs 146 and 156 do not extend beyond a plane $P_M$ in which an outer surface 136 of the mat 130, including outer surface portions 136A surrounding the first and second knee support pads 140 and 150, are located, see FIG. 16.

The ribs 146 and 156 may have a width $W_{MR}$ of from about 3 mm to about 4 mm and a height $H_{MR}$ that falls within a range of from about 0.5 mm to about 12 mm. Gaps $G_{MR}$ separating adjacent ribs 146 and 156 may have a dimension of from about 5 mm to about 6 mm. As will be apparent to one skilled in the art, other shapes and dimensions may be used for the first and second elements.

When an operator is driving the vehicle 10 in a direction indicated by arrow A in FIG. 1, the operator may rest his/her knees against the first and second main bodies 142 and 152. Due to the configuration of the first and second base sections 144, 154 of the first and second main bodies 142, 152, the main bodies 142, 152 function as leaf springs to absorb and attenuate forces applied by the operator's knees against the first and second main bodies 142 and 152. This spring-like mechanism inherent in the configuration or shape of the first and second base sections 144, 154 in conjunction with the flexible first and second ribs 146, 156 provide two separate mechanisms for absorbing and attenuating forces delivered to the first and second main bodies 142, 152 by the operator's knees.

Figure 18:
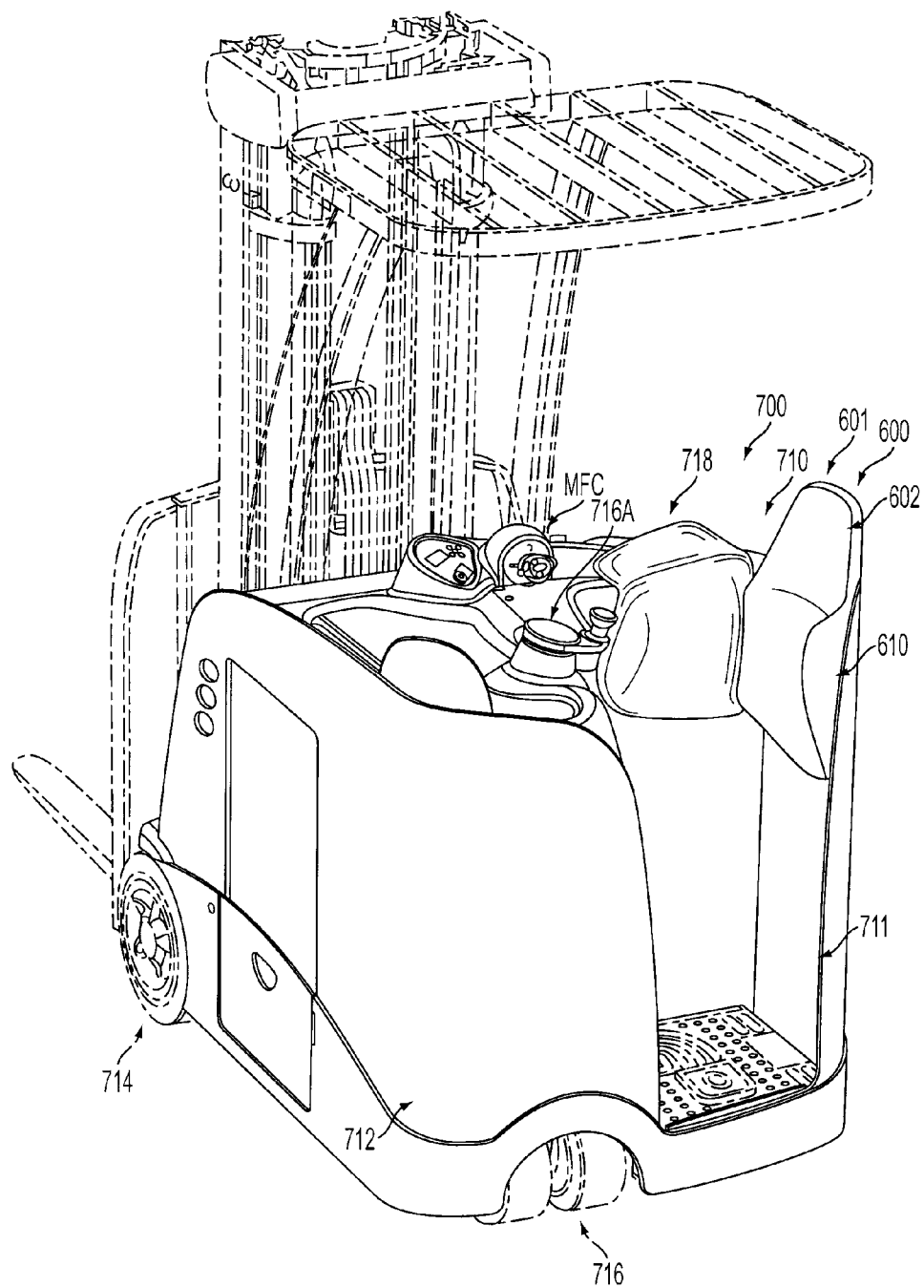
FIG. 18 is a perspective view of a backrest constructed in accordance with a further embodiment of the present invention mounted to a stand-up counterbalanced lift truck.
Figure 19:
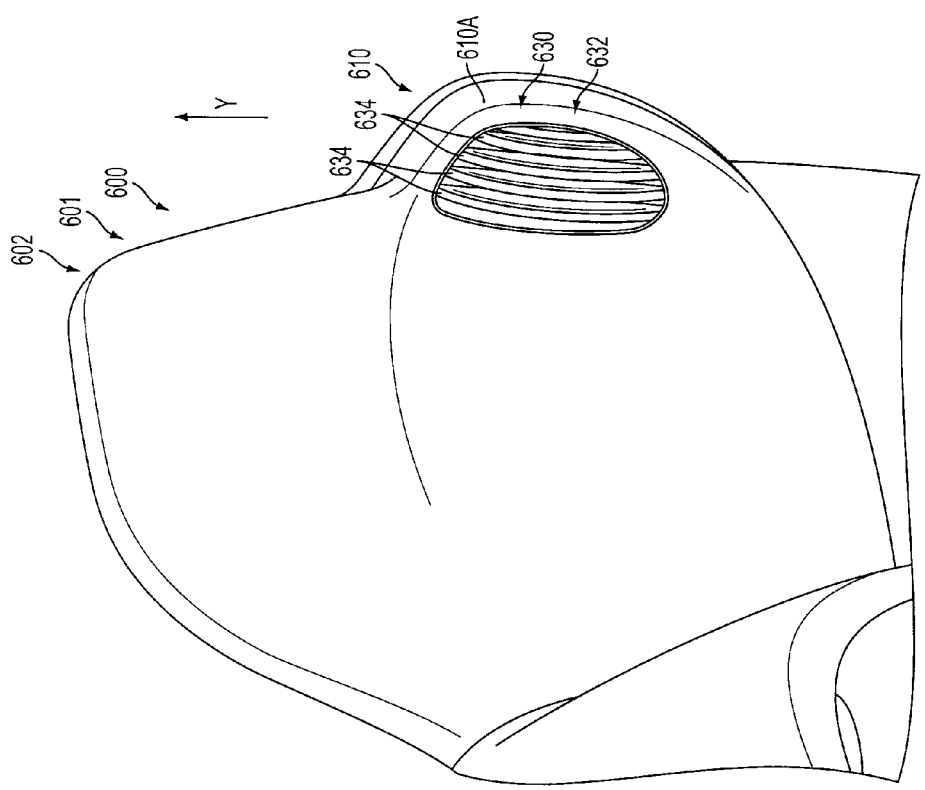
FIG. 19 is a perspective view of the backrest illustrated in FIG. 18.

Reference is now made to FIGS. 18 and 19, which illustrate a backrest 600 constructed in accordance with a further embodiment of the present invention. The backrest 600 is shown in FIG. 18 mounted within an operator compartment 710 of a stand-up counterbalanced fork lift truck 700. The fork lift truck 700 includes a main body 712, first and second driven wheels coupled to a front portion of the main body 712, only the first wheel 714 is illustrated in FIG. 18, and a steerable wheel assembly 716 coupled to a rear portion of the main body 712. It is contemplated that the backrest 600 may be mounted within a variety of other materials handling vehicles as well.

The operator compartment 710 is located within the main body 712 for receiving an operator. As is apparent from FIG. 18, the main body 712 includes a single entrance 711 into and out of the operator compartment 710. In addition to including the backrest 600, the operator compartment 710 further includes an armrest 718. The speed and direction of movement (forward or reverse) of the truck 700 can be controlled by the operator when positioned in the operator compartment 710 via a multifunction controller MFC. Steering is effected via a tiller 716A.

In the embodiment illustrated in FIG. 19, the backrest 600 comprises a primary structure or primary support pad 601 having a main portion 602, a single side bolster 610 extending outwardly from the main portion 602 and gripping structure 630. The primary structure 601 is contoured to receive an operator's back and/or hips while an operator is standing in the operator compartment 710 and driving the truck 700. The side bolster 610 is located near the operator compartment entrance 711, see FIG. 18. In the illustrated embodiment, the side bolster 610 extends outwardly from the main portion 602 at an angle greater than about 45 degrees, see FIGS. 18, 19A and 19B. The gripping structure 630 comprising a separate insert coupled to the side bolster 610 for gripping an operator during movement of the truck 700. However, the gripping structure 630 could be formed integral with the primary structure 601.

Figure 19A:
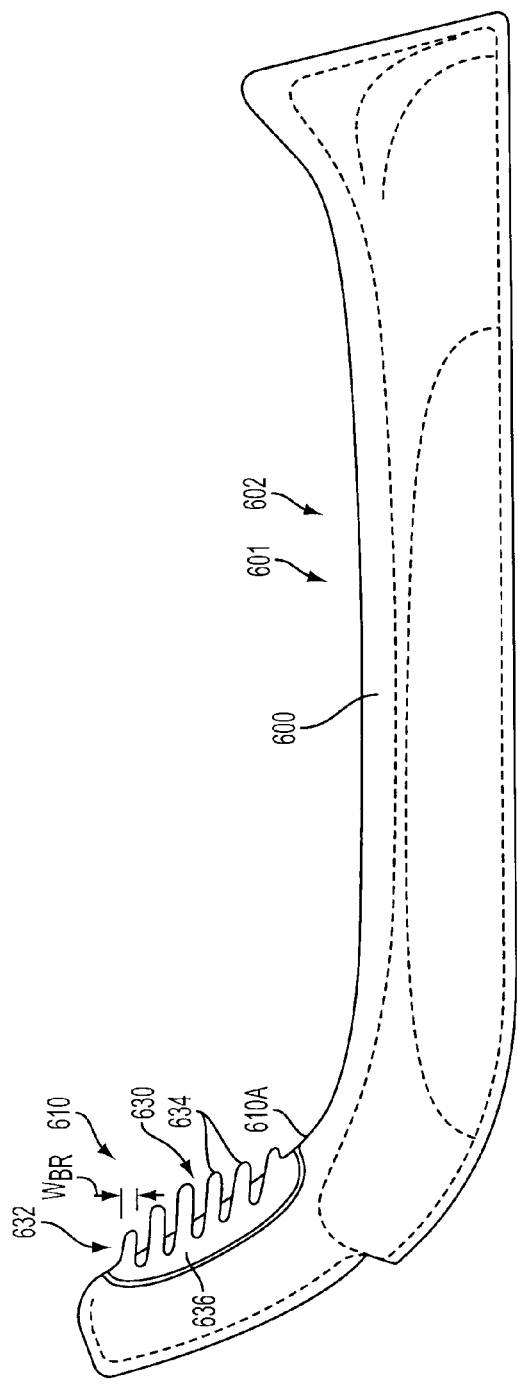
FIG. 19A is a top view of the backrest illustrated in FIG. 19.
Figure 19B:
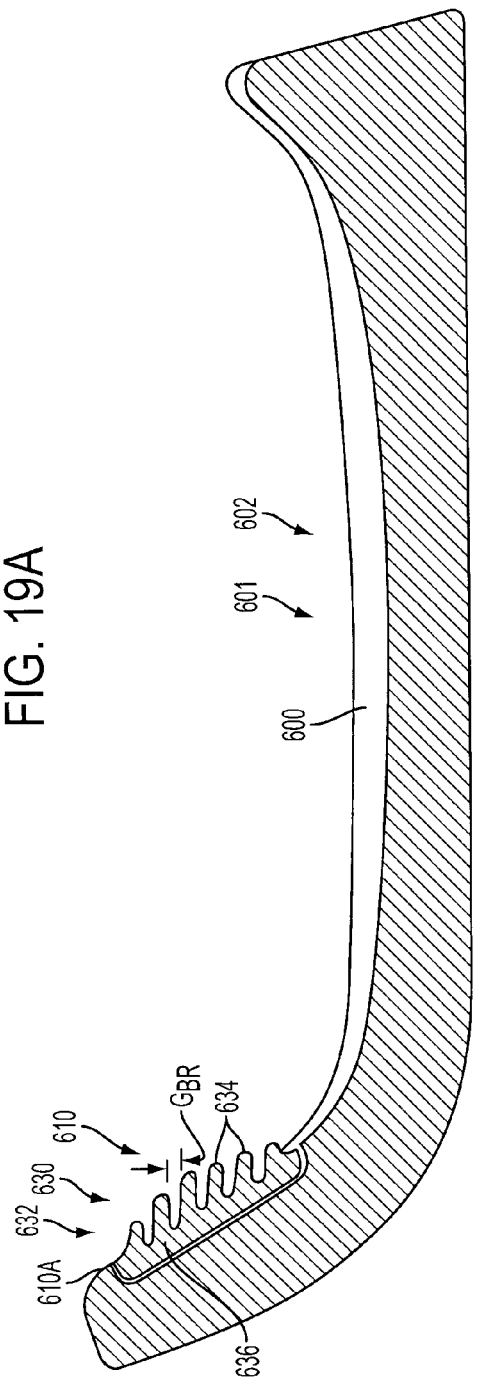
FIG. 19B is a cross sectional view of the backrest illustrated in FIG. 19.

In the illustrated embodiment, the gripping structure 630 comprises a main body 632 having a plurality of first elements 634, ribs in the illustrated embodiment, which are flexible relative to a first base section 636 of the main body 632, see FIGS. 19A and 19B. The ribs 634 may have a length in a Y direction, see FIG. 19, of between about 50 mm and 150 mm. The ribs 634 may also have a width $W_{BR}$ (the width $W_{BR}$ of only one rib 634 is designated in FIG. 19A) of between about 4 mm and about 6 mm. A gap $G_{BR}$ (only a single gap $G_{BR}$ between a pair of adjacent ribs 634 is designated in FIG. 19B) between adjacent ribs 634 may have a dimension of between about 4 mm and about 6 mm. The ribs 634 may have a height extending from the first base section 636 that falls within a range of from about 1 mm to about 10 mm. Preferably, the ribs 634 are substantially even with or extend above a portion 610A of the side bolster 610 surrounding the main body 632. For example, the ribs 634 extend from about 0 mm to about 6 mm above portion 610A. Due to their shape and size, the ribs 634 are adapted to engage an operator's back and/or hip when an operator engages, i.e., leans against, the backrest 600. When the operator is engaged with the backrest 600 during truck travel, including truck turns, the ribs 634 assist in maintaining the operator within the operator compartment 710.

Figure 20A:
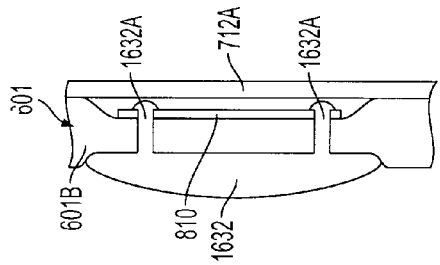
FIGS. 20A-20C illustrate first, second and third embodiments for coupling a gripping structure main body to a primary support pad.
Figure 20B:
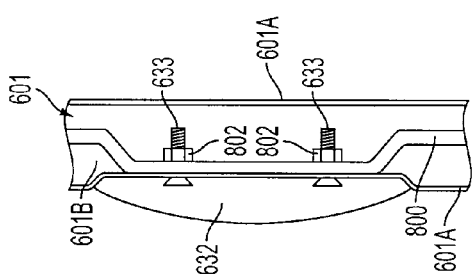
Figure 20C:
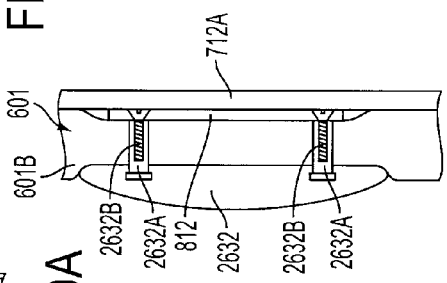

The primary structure 601 comprises an outer skin 601A and an inner foam section 601B, see FIGS. 20A-20C. The outer skin 601A may comprise a polymeric material such as molded vinyl and the inner foam section 601B may be formed from a polymeric material such as polyurethane foam. The gripping structure main body 632 may be formed from a polymeric material such as a synthetic rubber.

In a first embodiment illustrated in FIG. 20A, a steel insert 800 is molded into the primary structure 601. Threaded inserts or nuts 802 are also molded into the primary structure 601. Threaded bolts 633 are molded into the gripping structure main body 632. The main body 632 may be coupled to primary structure 601 by passing the bolts 633 through corresponding openings in the steel insert 800 and subsequently connecting the nuts 802 to the bolts 633. The operation of coupling the main body 632 to the steel insert 800 is effected prior to a foaming operation to form the inner foam section 601B. Also, an outer skin layer 601A is positioned between the main body 632 and the steel insert 800 prior to coupling the main body 632 to the steel insert 800.

In a second embodiment illustrated in FIG. 20B, a steel plate 810 is positioned behind the primary structure 601. The gripping structure main body 1632 is molded with two or more tabs 1632A which extend through bores in the primary structure 601 and lockingly engage bores in the steel plate 810.

In a third embodiment illustrated in FIG. 20C, a steel plate 812 is positioned behind the primary structure 601. Threaded inserts or nuts 2632A are molded into the gripping structure main body 2632. Bolts 2632B extend through bores in the steel plate 812 and threadedly engage the nuts 2632A so as to coupled the main body 2632 to the primary structure 601.

The primary structure 601, having the gripping structure main body coupled thereto, may be connected to a wall 712A of the truck main body 712 via adhesive, bolts, or other like connecting mechanisms.

In accordance with yet a further embodiment of the present invention, a backrest 1600 for use in the truck 700 of FIG. 18 may include gripping structure 1630 comprising a single pad 1630A having a long and narrow shape, see FIG. 21. The single pad 1630A is secured to a primary structure or primary support pad 1601 of the backrest 1600 via an adhesive 1603, such as cement glue, or an industrial grade double-stick tape. Preferably, the single pad 1630A extends above a portion 1610A of a side bolster 1610 of the backrest 1600 surrounding the pad 1630A by an amount of from about 3 mm to about 6 mm. The single pad 1630A may be formed from a polymeric material such as a synthetic rubber. The primary structure 1601 may comprise an outer skin 1601A and an inner foam section 1601B, which may be formed from the same materials from which the outer skin 601A and the inner foam section 601B are formed in the embodiments illustrated in FIGS. 20A-20C and described above.

In a still further embodiment of the present invention, instead of using the long and narrow single pad 1630A illustrated in FIG. 21, a pad 1630A' formed from substantially the same material as pad 1630A but having generally the same outer peripheral shape as the gripping structure 630 of the FIG. 19 embodiment may be used, see FIGS. 22, 22A and 22B.

Figure 23:
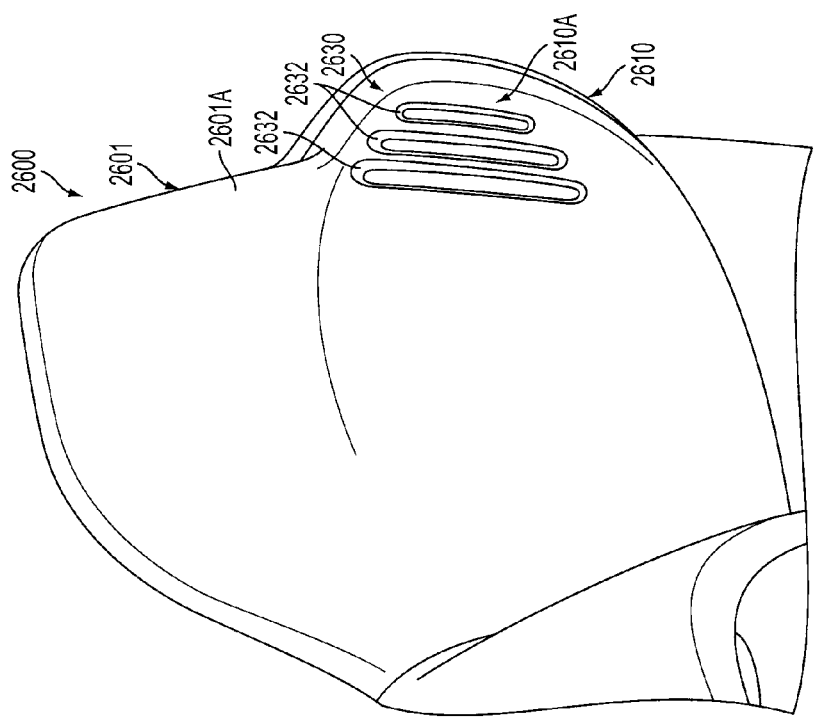
FIG. 23 is a perspective view of a backrest having gripping structure comprising first, second and third ribs.

In accordance with another embodiment of the present invention, a backrest 2600 for use in the truck 700 of FIG. 18 may include gripping structure 2630 comprising first, second and third ribs 2632 which are formed integral with a primary structure or primary support pad 2601 of the backrest 2600, see FIG. 23. The ribs 2632 have a long and narrow shape. Preferably, the ribs 2632 extend above a portion 2610A of a side bolster 2610 of the backrest 2600 surrounding the ribs 2632 by an amount of from about 3 mm to about 6 mm. The primary structure 2601 including the ribs 2632 may comprise an outer skin 2601A and an inner foam section (not shown), which may be formed from the same materials from which the outer skin 601A and the inner foam section 601B are formed in the embodiments illustrated in FIGS. 20A-20C and described above. Due to their shape and size, the ribs 2632 are adapted to engage an operator's back and/or hip when an operator engages, i.e., leans against, the backrest 2600. When the operator is engaged with the backrest 2600 during truck travel, including truck turns, the ribs 2632 assist in maintaining the operator within the operator compartment 710.

Figure 24:
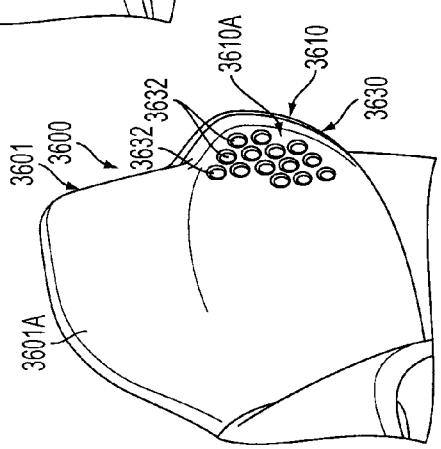
FIG. 24 is a perspective view of a backrest having gripping structure comprising a plurality of generally circular gripping pads.

In yet another embodiment of the present invention, illustrated in FIG. 24, the gripping structure 3630 comprises a plurality of generally circular gripping pads 3632. The gripping pads 3632 are formed integral with a primary structure or primary support pad 3601 of the backrest 3600. Preferably, the pads 3632 extend above a portion 3610A of a side bolster 3610 of the backrest 3600 surrounding the pads 3632 by an amount of from about 3 mm to about 6 mm. The primary structure 3601 including the pads 3632 may comprise an outer skin 3601A and an inner foam section (not shown), which may be formed from the same materials from which the outer skin 601A and the inner foam section 601B are formed in the embodiments illustrated in FIGS. 20A-20C and described above. Due to their shape and size, the ribs 3632 are adapted to engage an operator's back and/or hip when an operator engages, i.e., leans against, the backrest 3600.

Figure 25:
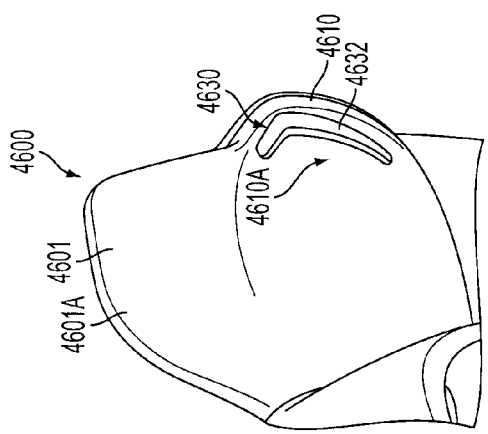
FIG. 25 is a perspective view of a backrest having gripping structure comprising an L-shaped rib.

In still another embodiment of the present invention, illustrated in FIG. 25, the gripping structure 4630 comprises a single L-shaped rib 4632. The L-shaped rib 4632 is formed integral with a primary structure or primary support pad 4601 of the backrest 4600 illustrated in FIG. 25. Preferably, the rib 4632 extends above a portion 4610A of a side bolster 4610 of the backrest 4600 surrounding the rib 4632 by an amount of from about 3 mm to about 6 mm. The primary structure 4601 including the rib 4632 may comprise an outer skin 4601A and an inner foam section (not shown), which may be formed from the same materials from which the outer skin 601A and the inner foam section 601B are formed in the embodiments illustrated in FIGS. 20A-20C and described above. Due to its shape and size, the rib 4632 is adapted to engage an operator's back and/or hip when an operator engages, i.e., leans against, the backrest 4600.

The operator compartment 710 of the stand-up counterbalanced fork lift truck 700 of FIG. 18 is further illustrated in FIG. 26. As shown in FIGS. 26 and 26A, a knee recess 5000 is provided in the operator compartment 710 for receiving a knee of an operator when the operator is standing and/or sitting in the operator compartment 710. The knee recess 5000 is defined by first, second and third metal walls 5000A-5000C of the truck main body 712, see FIG. 26A. A kneepad 5100 is also provided in the operator compartment 710 and is adapted to cover a fourth metal wall 5000D of the main body 712 as well as a corner section 5000E of the main body 712 located where the first and fourth walls 5000A and 5000D come together. A main body portion 5102 of the kneepad 5100 is intended to be contacted by a left knee of an operator when the operator is standing and/or sitting in the operator compartment 710. A corner portion 5104 of the kneepad 5100 is positioned to cover the corner section 5000E of the main body.

Figure 28:
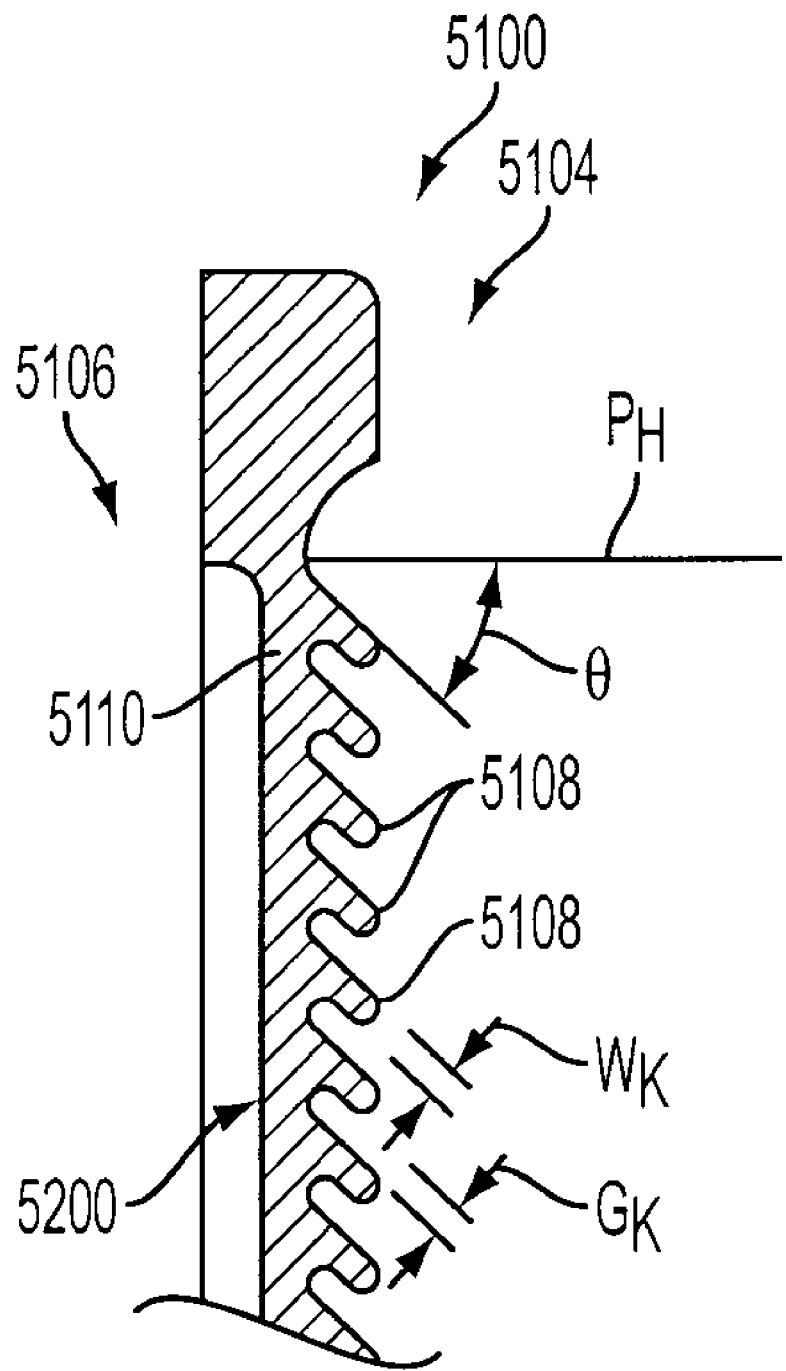
FIG. 28 is an enlarged cross sectional view of a portion of the kneepad illustrated in FIG. 27.
Figure 30:
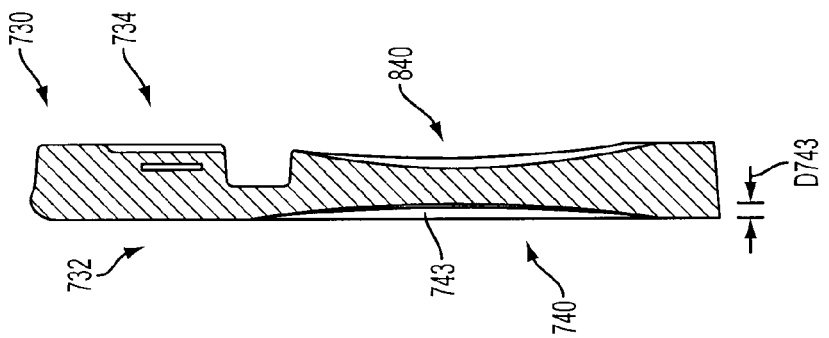
FIG. 30 is a cross sectional view taken along section line 30-30 in FIG. 29.
Figure 29:
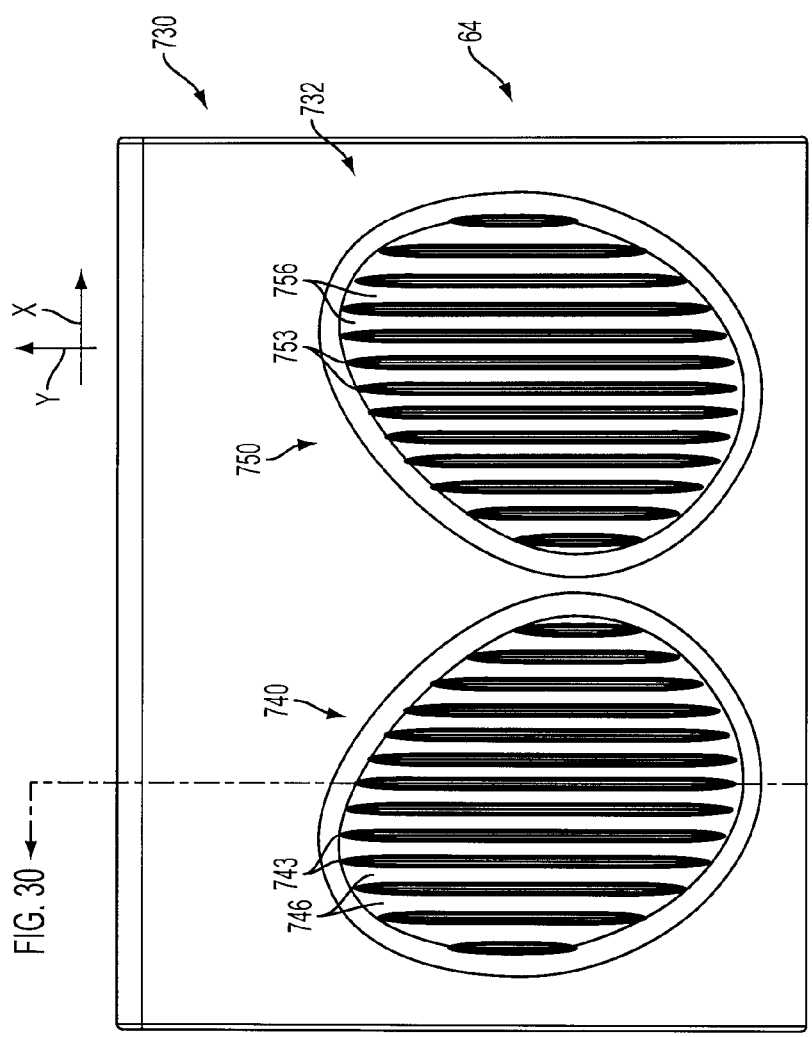
FIG. 29 is a view of a front side of a mat constructed in accordance with a further embodiment of the present invention, wherein the mat defines a second wall of an operator compartment in the truck illustrated in FIG. 3.

The corner portion 5104 comprises a main body 5106 having a plurality of first elements 5108, ribs in the illustrated embodiment, which are flexible relative to a base section 5110 of the main body 5106, see FIGS. 27A and 28. The ribs 5108 may have a width $W_K$ (the width $W_K$ of only one rib 5108 is designated in FIG. 28) of between about 3 mm and about 6 mm. A gap $G_K$ (only a single gap $G_K$ between a pair of adjacent ribs 5108 is designated in FIG. 28) between adjacent ribs 5108 may have a dimension of between about 4 mm and about 6 mm. The ribs 5108 may extend downwardly from a horizontal plane $P_H$, see FIG. 28, at an angle θ of between about 10 degrees and about 60 degrees and preferably about 45 degrees. Due to their shape and size, the ribs 5108 are adapted to be engaged by an operator's knee should an operator accidentally make contact with the corner section 5000E of the main body 712 when the operator is inserting his/her knee into the knee recess 5000.

As is apparent from FIGS. 27A and 28, the base section 5110 of the main body 5106 is configured such that a pocket 5200 is defined behind the ribs 5108 and the base section 5110 when a force is not being applied to the main body 5106. The main body 5106 is capable of deforming inwardly toward the corner section 5000E when a force is applied thereto. Hence, the base section 5110 of the pad main body 5106 functions as a leaf spring to absorb and attenuate forces applied by the operator's knee against the main body 5106. This spring-like mechanism inherent in the configuration or shape of the base section 5110 in conjunction with the flexible ribs 5108 provide two separate mechanisms for absorbing and attenuating forces delivered to the pad main body 5106 by an operator's knee.

In accordance with a further embodiment of the present invention, the second wall 64 of the operator compartment 60 may be defined by a polymeric mat 730 having first and second knee support pads 740 and 750, respectively, incorporated therein, see FIGS. 29-35. That is, the knee support pads 740 and 750 are integral with the polymeric mat 730 in this embodiment. Alternatively, the knee support pads 740 and 750 may comprise separate elements coupled to the mat 730 via adhesive, fasteners or the like.

Figure 34:
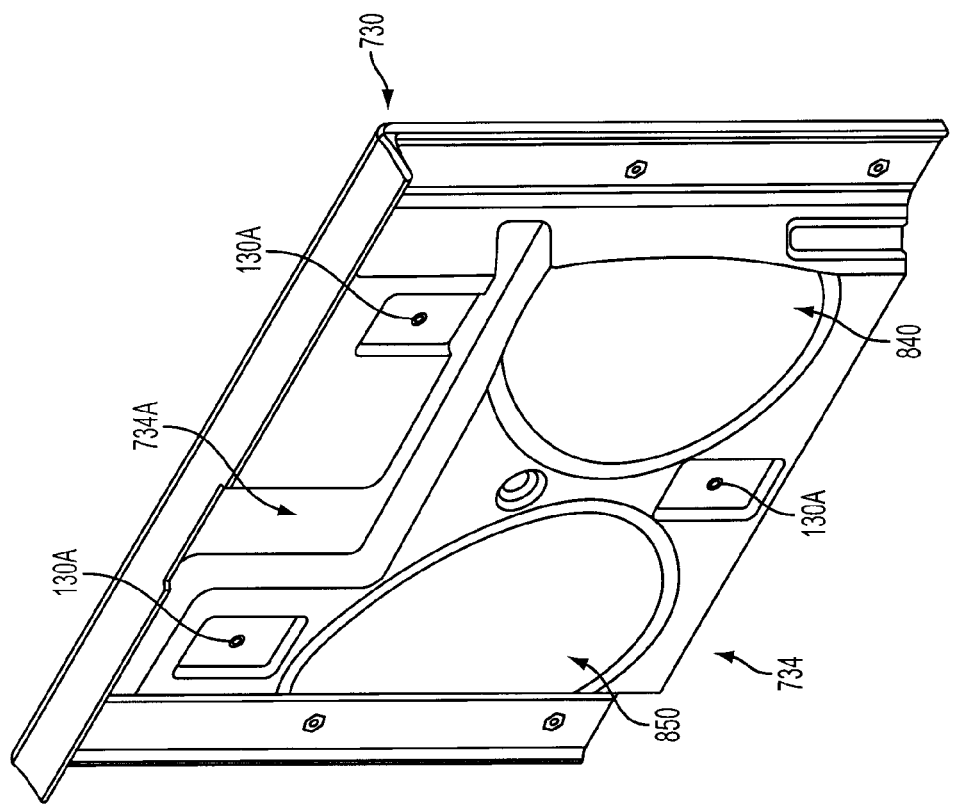
FIG. 34 is a perspective view of a back side of the mat illustrated in FIG. 29.
Figure 35:
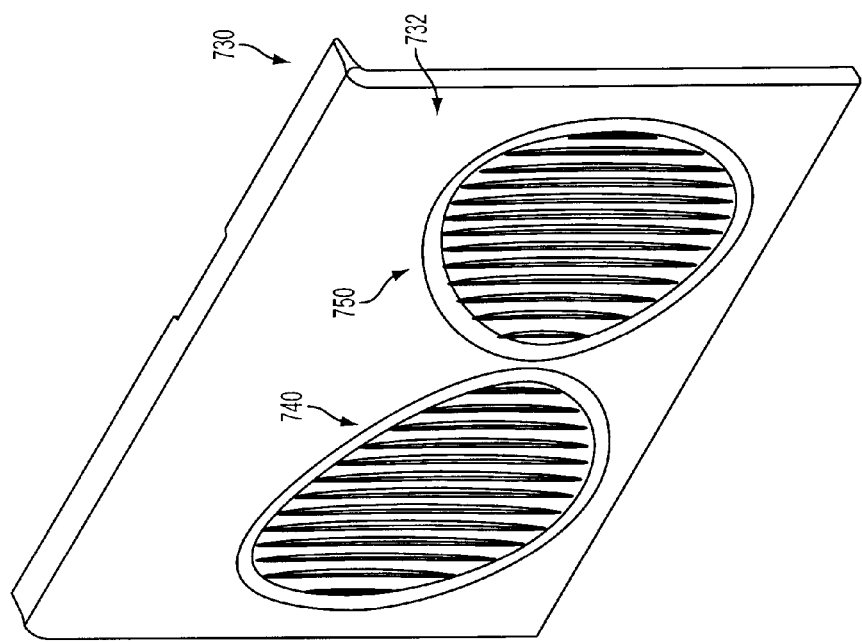
FIG. 35 is a perspective view of a front side of the mat illustrated in FIG. 29.

The mat 730 may include three molded-in threaded inserts or nuts 130A (shown in FIG. 34). Bolts 130B extend through a wall 50A of the battery compartment, see FIG. 14A, and engage the nuts 130A so as to secure the mat 730 to the battery compartment wall 50A.

The mat 730 has a front side 732, which is visible to an operator, and a back side 734, see FIG. 34, which is positioned adjacent to the battery compartment wall 50A. A channel 734A is formed in the back side 734 of the mat 730 for receiving a wiring harness (not shown) coupled to the control handle structure 70. The back side 734 of the mat 730 is also provided with first and second recesses 840 and 850 corresponding respectively to the first and second support pads 740 and 750.

The first knee support pad 740 comprises a first main body 742 having a first base section 744 and a plurality of first elements or ribs 746. A plurality of recesses 743 are spaced apart in an X direction, extend lengthwise in a Y direction and are provided between the first ribs 746, see FIGS. 29-32. The width $W_{746}$ of each rib 746 in the X direction when measured from adjacent edges of adjacent recesses 743 may be from about 10 mm to about 15 mm, see FIG. 32. The depth $D_{743}$ of each recess 743 may be from about 1 mm to about 3 mm, see FIGS. 30 and 32. The width $W_{743}$ of each recess 743 may be from about 3 mm to about 5 mm, see FIG. 31. Because the width $W_{746}$ of each rib 746 is substantially large relative to the depth $D_{743}$ of each recess 743, the ribs 746 are substantially non-flexible in the X direction but are capable of flexing inwardly with the remaining portion of the main body 742 when the main body 742 receives a sufficient force from an operator's knee to cause the main body 742 to flex inward toward the battery compartment wall 50A. The first recess 840 is provided behind the first main body 742.

The second knee support pad 750 comprises a second main body 752 having a second base section 754 and a plurality of second elements or ribs 756. A plurality of recesses 753 are spaced apart in an X direction, extend lengthwise in a Y direction and are provided between the second ribs 756, see FIGS. 29, 31-33. The width $W_{756}$ of each rib 756 in the X direction when measured from adjacent edges of adjacent recesses 753 may be from about 10 mm to about 15 mm, see FIG. 33. The depth $D_{753}$ of each recess 753 may be from about 1 mm to about 3 mm, see FIG. 33. The width $W_{753}$ of each recess 753 may be from about 3 mm to about 5 mm, see FIG. 31. Because the width $W_{756}$ of each rib 756 is substantially large relative to the depth $D_{753}$ of each recess 753, the ribs 756 are substantially non-flexible in the X direction but are capable of flexing inwardly with the remaining portion of the main body 752 when the main body 752 receives a sufficient force from an operator's knee to cause the main body 752 to flex inward toward the battery compartment wall 50A. The second recess 850 is provided behind the second main body 752.

It is noted that the recesses 743, 753 function to reduce the likelihood that an operator's knees will slip off the support pads 740, 750.

As will be apparent to one skilled in the art, other shapes and dimensions may be used for the first and second recesses 743, 753 and the first and second elements 746, 756.

When an operator is driving a vehicle in which the mat 730 is incorporated, the operator may rest his/her knees against the first and second main bodies 742 and 752. Due to the configuration of the first and second base sections 744, 754 of the first and second main bodies 742, 752, i.e., due to the recesses 840, 850 provided in the base sections 744, 754, the main bodies 742, 752 function as leaf springs to absorb and attenuate forces applied by the operator's knees against the first and second main bodies 742 and 752. This spring-like mechanism inherent in the configuration or shape of the first and second base sections 744, 754 provides a mechanism for absorbing and attenuating forces delivered to the first and second main bodies 742, 752 by the operator's knees.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising a walk-through operator compartment comprising opposing first and second walls and a backrest associated with said first wall comprising a primary support pad and gripping structure located in at least one side portion of said primary support pad, said gripping structure being substantially even with or extending above a surface of a portion of said primary support pad surrounding said gripping structure for engagement with an operator positioned on said materials handling vehicle, wherein said operator compartment further comprises a first knee support pad associated with said second wall comprising a first main body having a first base section and a plurality of first elements.

2. A materials handling vehicle as set forth in claim 1, wherein said gripping structure comprises at least one geometric element being generally circular, generally rectangular, generally elliptical, or generally L-shaped in shape.

3. A materials handling vehicle as set forth in claim 1, wherein said gripping structure comprises a first main body located in a first side portion of said primary support pad and a second main body located in a second side portion of said primary support pad, said gripping structure first main body having a gripping structure first base section and a plurality of gripping structure first elements which are flexible relative to said gripping structure first base section, and said second main body having a second base section and a plurality of second elements which are flexible relative to said second base section.

4. A materials handling vehicle as set forth in claim 3, wherein said primary support pad further includes a central portion and each of said first and second side portions extends relative to a plane generally tangent with said central portion at an angle less than about 45 degrees.

5. A materials handling vehicle as set forth in claim 1, wherein said knee support pad first elements are flexible relative to said knee support pad first base section.

6. A materials handling vehicle as set forth in claim 1, wherein said knee support pad first elements are substantially non-flexible in at least one direction and separated from one another by recesses.

7. A materials handling vehicle as set forth in claim 1, wherein said operator compartment further comprises a second knee support pad associated with said second wall comprising a second main body having a second base section and a plurality of second elements.

8. A materials handling vehicle as set out in claim 1, wherein said primary support pad comprises first and second side portions and a central portion located between said first and second side portions, said gripping structure being located in at least one of said first and second side portions of said primary support pad, said central portion being spaced further away from a center location of said operator's compartment than said first and second side portions.

* * * * *